(12) United States Patent
Coimbra De Andrade et al.

(10) Patent No.: US 11,651,195 B2
(45) Date of Patent: May 16, 2023

(54) SYSTEMS AND METHODS FOR UTILIZING A MACHINE LEARNING MODEL COMBINING EPISODIC AND SEMANTIC INFORMATION TO PROCESS A NEW CLASS OF DATA WITHOUT LOSS OF SEMANTIC KNOWLEDGE

(71) Applicant: Verizon Connect Development Limited, Dublin (IE)

(72) Inventors: Douglas Coimbra De Andrade, Florence (IT); Leonardo Taccari, Florence (IT)

(73) Assignee: Verizon Connect Development Limited, Dublin (IE)

( * ) Notice: Subject to any disclaimer, the term of this patent is extended or adjusted under 35 U.S.C. 154(b) by 254 days.

(21) Appl. No.: 17/008,398

(22) Filed: Aug. 31, 2020

(65) Prior Publication Data

US 2022/0067485 A1    Mar. 3, 2022

(51) Int. Cl.
| | |
|---|---|
| *G06F 18/211* | (2023.01) |
| *G06N 3/045* | (2023.01) |
| *G06N 3/08* | (2023.01) |
| *G06F 18/22* | (2023.01) |
| *G06F 18/214* | (2023.01) |

(52) U.S. Cl.
CPC ............ *G06N 3/045* (2023.01); *G06F 18/211* (2023.01); *G06F 18/214* (2023.01); *G06F 18/22* (2023.01); *G06N 3/08* (2013.01)

(58) Field of Classification Search
CPC ........ G06N 3/0454; G06N 3/08; G06N 3/045; G06K 9/6215; G06K 9/6228; G06K 9/6256

See application file for complete search history.

(56) References Cited

U.S. PATENT DOCUMENTS

| | | | | |
|---|---|---|---|---|
| 10,650,278 | B1* | 5/2020 | Ho | G06V 20/64 |
| 11,112,943 | B1* | 9/2021 | Alameh | G06F 3/04817 |
| 11,238,596 | B1* | 2/2022 | Gadde | G06V 30/19173 |
| 2008/0097854 | A1* | 4/2008 | Young | H04N 21/47815 |
| | | | | 705/14.43 |
| 2008/0294590 | A1* | 11/2008 | Gupta | G06N 5/02 |
| | | | | 706/59 |
| 2010/0061624 | A1* | 3/2010 | Cobb | G06V 10/761 |
| | | | | 382/157 |

(Continued)

OTHER PUBLICATIONS

Alber, et al., "iNNvestigate Neural Networks!", Journal of Machine Learning Research 20 (2019) 1-8.

(Continued)

*Primary Examiner* — Solomon G Bezuayehu

(57) ABSTRACT

A device may receive an image. The device may utilize an episodic memory to determine a first classification associated with the image. The device may utilize a semantic memory to determine a second classification associated with the image. The device may determine an accuracy associated with utilizing the semantic memory to determine the second classification. The device may determine that the image is associated with the first classification when the accuracy fails to satisfy a threshold accuracy. The device may determine that the image is associated with the second classification when the accuracy satisfies the threshold accuracy.

20 Claims, 15 Drawing Sheets

(56) References Cited

U.S. PATENT DOCUMENTS

| | | | | |
|---|---|---|---|---|
| 2010/0208986 | A1* | 8/2010 | Cobb | G06V 20/52 |
| | | | | 382/165 |
| 2015/0106310 | A1* | 4/2015 | Birdwell | G06N 3/02 |
| | | | | 706/26 |
| 2015/0213302 | A1* | 7/2015 | Madabhushi | G06V 10/764 |
| | | | | 382/133 |
| 2015/0278688 | A1* | 10/2015 | Miao | G06N 5/022 |
| | | | | 706/55 |
| 2017/0177979 | A1* | 6/2017 | Chokshi | G06V 10/82 |
| 2017/0252924 | A1* | 9/2017 | Vijayanarasimhan | |
| | | | | B25J 9/1697 |
| 2018/0240015 | A1* | 8/2018 | Martin | G06N 3/047 |
| 2020/0286614 | A1* | 9/2020 | Do | G16H 15/00 |
| 2020/0380293 | A1* | 12/2020 | Finnie | G06F 18/214 |
| 2021/0089825 | A1* | 3/2021 | Shen | G06V 30/244 |
| 2021/0150345 | A1* | 5/2021 | Abati | G06N 3/08 |
| 2021/0169417 | A1* | 6/2021 | Burton | A61B 5/4857 |
| 2022/0012487 | A1* | 1/2022 | Nepomniachtchi | G06V 30/40 |

OTHER PUBLICATIONS

Assi, et al., "Modified Large Margin Nearest Neighbor Metric Learning for Regression", IEEE Signal Processing Letters, vol. 21, No. 3, (2014): pp. 292-296.

Bahdanau, et al., "Neural Machine Translation by Jointly Learning to Align and Translate", Published as a conference paper at International Conference on Learning Representations (ICLR) 2015.

Chen, et al., "Neural Machine Translation With Sentence-Level Topic Context", IEEE/ACM Transactions on Audio, Speech, and Language Processing, vol. 27, No. 12, pp. 1970-1984, Dec. 2019.

Coimbra De Andrade, et al., "DeclareNet: Replicating declarative memory with deep neural networks", Journal of Machine Learning Research 1 (2020) 1-21.

Geirhos, et al., "Generalisation in humans and deep neural networks", 32nd Conference on Neural Information Processing Systems (NeurIPS 2018), Montréal, Canada.

Goodfellow, et al., "Explaining and Harnessing Adversarial Examples", Published as a conference paper at International Conference on Learning Representations (ICLR) 2015.

He, et al., "Deep Residual Learning for Image Recognition", arXiv:1512.03385v1 [cs.CV] Dec. 10, 2015.

Horzyk, et al., "Integration of Semantic and Episodic Memories", IEEE Transactions on Neural Networks and Learning Systems—Aug. 2017.

Kaiser, et al., "Learning To Remember Rare Events", Published as a conference paper at International Conference on Learning Representations (ICLR), Mar. 9, 2017.

Khandelwal, et al., "Generalization Through Memorization: Nearest Neighbor Language Models", Published as a conference paper at (ICLR) International Conference on Learning Representations, Feb. 15, 2020.

Lake, et al., "Building Machines That Learn and Think Like People", In press at Behavioral and Brain Sciences. arXiv:1604.00289V3 [cs.AI] Nov. 2, 2016.

Liu, et al., "Image caption generation with dual attention mechanism", Information Processing and Management (2020) 102178, pp. 1-10, © 2019 Elsevier Ltd. All rights reserved.

Ma, et al., "Visual Question Answering with Memory-Augmented Networks", Australian Institute for Machine Learning, and Australian Centre for Robotic Vision, The University of Adelaide, Mar. 25, 2018.

Nguyen, et al., "Large-scale distance metric learning for k-nearest neighbors regression", Neurocomputing 214 (2016) 805-814, (c) 2016 Elsevier B.V. All rights reserved.

Orhan, "A Simple Cache Model for Image Recognition", 32nd Conference on Neural Information Processing Systems (NIPS 2018), Montréal, Canada.

Papernot, et al., "Deep k-Nearest Neighbors: Towards Confident, Interpretable and Robust Deep Learning", Department of Computer Science and Engineering, Pennsylvania State University, Mar. 13, 2018.

Pedregosa, et al., "Scikit-learn: Machine Learning in Python", Journal of Machine Learning Research 12 (2011) 2825-2830.

Peng, et al., "Improved kN Nearest Neighbor Estimation Algorithm for SAR Image Clutter Statistical Modeling", 2019 4th International Conference on Information Systems Engineering (ICISE).

Ping, et al., "Deep Voice 3: Scaling Text-To-Speech With Convolutional Sequence Learning", Published as a conference paper at (ICLR) International Conference on Learning Representations, 2018.

Prajapati, et al., "High Dimensional Nearest Neighbor Search Considering Outliers based on Fuzzy Membership", Computing Conference 2017, Jul. 18-20, 2017, London, UK.

Russakovsky, et al., "ImageNet Large Scale Visual Recognition Challenge", arXiv:1409.0575v3 [cs.CV] Jan. 30, 2015.

Santoro, et al., "Meta-Learning with Memory-Augmented Neural Networks", Proceedings of the 33rd International Conference on Machine Learning, New York, NY, USA, 2016. JMLR: W&CP vol. 48. Copyright 2016 by the author (s).

Shen, et al., "Natural TTS Synthesis by Conditioning Wavenet on MEL Spectrogram Predictions", arXiv:1712.05884v2 [cs.CL] Feb. 16, 2018.

Si, et al., "Memory Efficient Kernel Approximation", Journal of Machine Learning Research 18 (2017) 1-32.

Sonoda, et al., "Transport Analysis of Infinitely Deep Neural Network", Journal of Machine Learning Research 20 (2019)1-52.

Stampacchia, et al., "Shared processes resolve competition within and between episodic and semantic memory Evidence from patients with LIFG lesions", Cortex 108 (2018) 127-143, © 2018 The Authors. Published by Elsevier Ltd.

Szegedy, et al., "Going deeper with convolutions", arXiv:1409.4842v1 [cs.CV] Sep. 17, 2014.

Tang, et al., "MCENN: A variant of extended nearest neighbor method for pattern recognition", Pattern Recognition Letters 133 (2020) 116-122, © 2020 Elsevier B.V. All rights reserved.

Tulving, "Episodic Memory: From Mind to Brain", Annu. Rev. Psychol. 2002. 53:1-25, Copyright (c) 2002 by Annual Reviews. All rights reserved.

Vaswani, et al., "Attention Is All You Need", 31st Conference on Neural Information Processing Systems (NIPS 2017), Long Beach, CA, USA.

Vinyals, et al., "Matching Networks for One Shot Learning", arXiv:1606.04080v2 [cs.LG] Dec. 29, 2017.

Wang, et al., "Visualizing deep neural network by alternately image blurring and deblurring", Neural Networks 97 (2018) 162-172, © 2017 Elsevier Ltd. All rights reserved.

Weston, et al., "Memory Networks", Published as a conference paper at International Conference on Learning Representations (ICLR) 2015.

Xiao, et al., "Fashion-MNIST: a Novel Image Dataset for Benchmarking Machine Learning Algorithms", arXiv:1708.07747v2 [cs.LG] Sep. 15, 2017.

Xu, et al., "Show, Attend and Tell: Neural Image Caption Generation with Visual Attention", arXiv:1502.03044v3 [cs.LG] Apr. 19, 2016.

Zhao, et al., "Retrieval-Augmented Convolutional Neural Networks for Improved Robustness against Adversarial Examples", arXiv:1802.09502v1 [cs.LG] Feb. 26, 2018.

\* cited by examiner

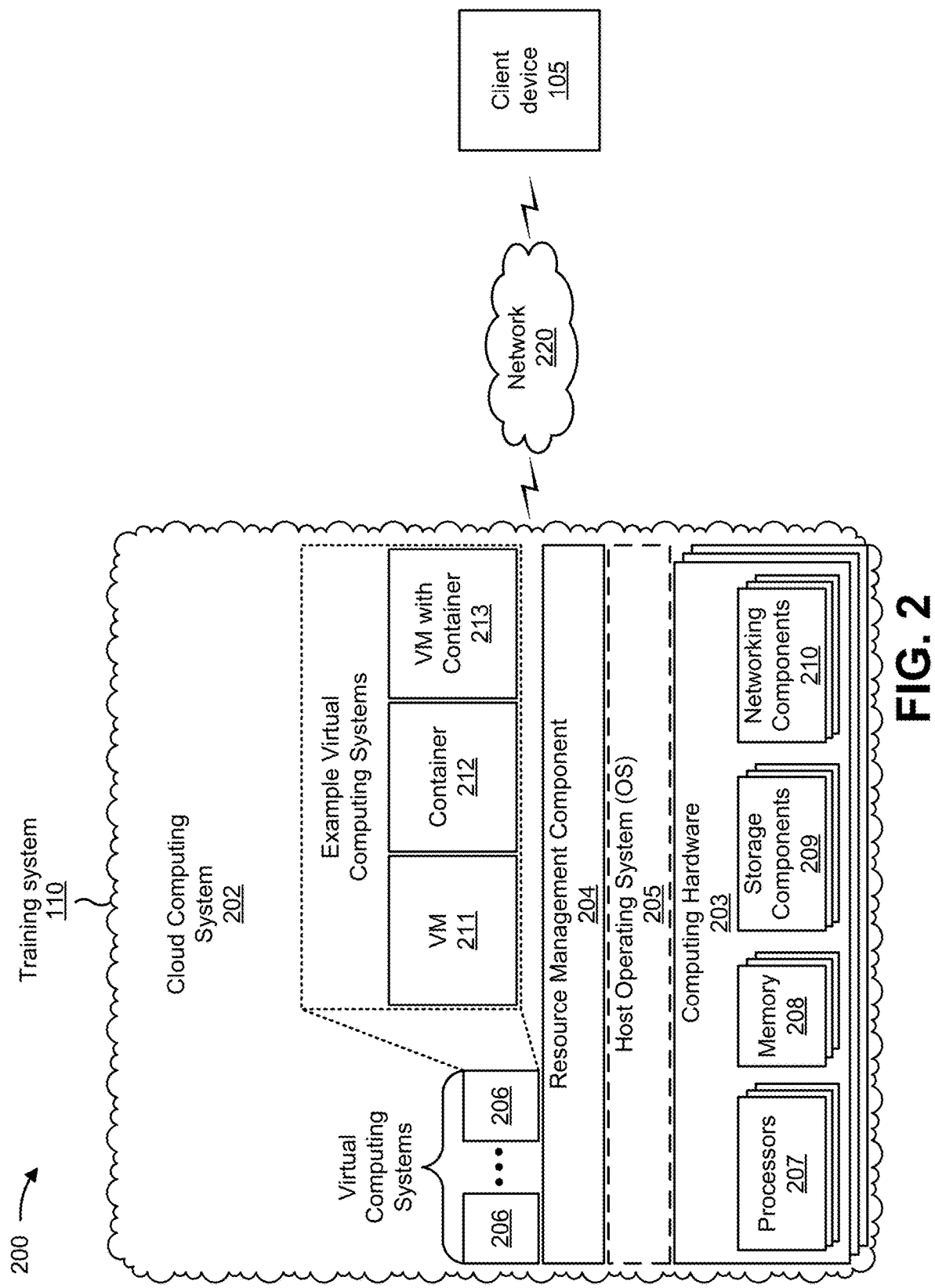

SYSTEMS AND METHODS FOR UTILIZING A MACHINE LEARNING MODEL COMBINING EPISODIC AND SEMANTIC INFORMATION TO PROCESS A NEW CLASS OF DATA WITHOUT LOSS OF SEMANTIC KNOWLEDGE

BACKGROUND

A machine learning model utilizes one or more machine learning algorithms to build a mathematical model based on sample data in order to make a prediction or a decision without being explicitly programmed to make the prediction or the decision.

BRIEF DESCRIPTION OF THE DRAWINGS

FIG. 2 is a diagram of an example environment in which systems and/or methods described herein may be implemented.

DETAILED DESCRIPTION OF PREFERRED EMBODIMENTS

Figure 1A:
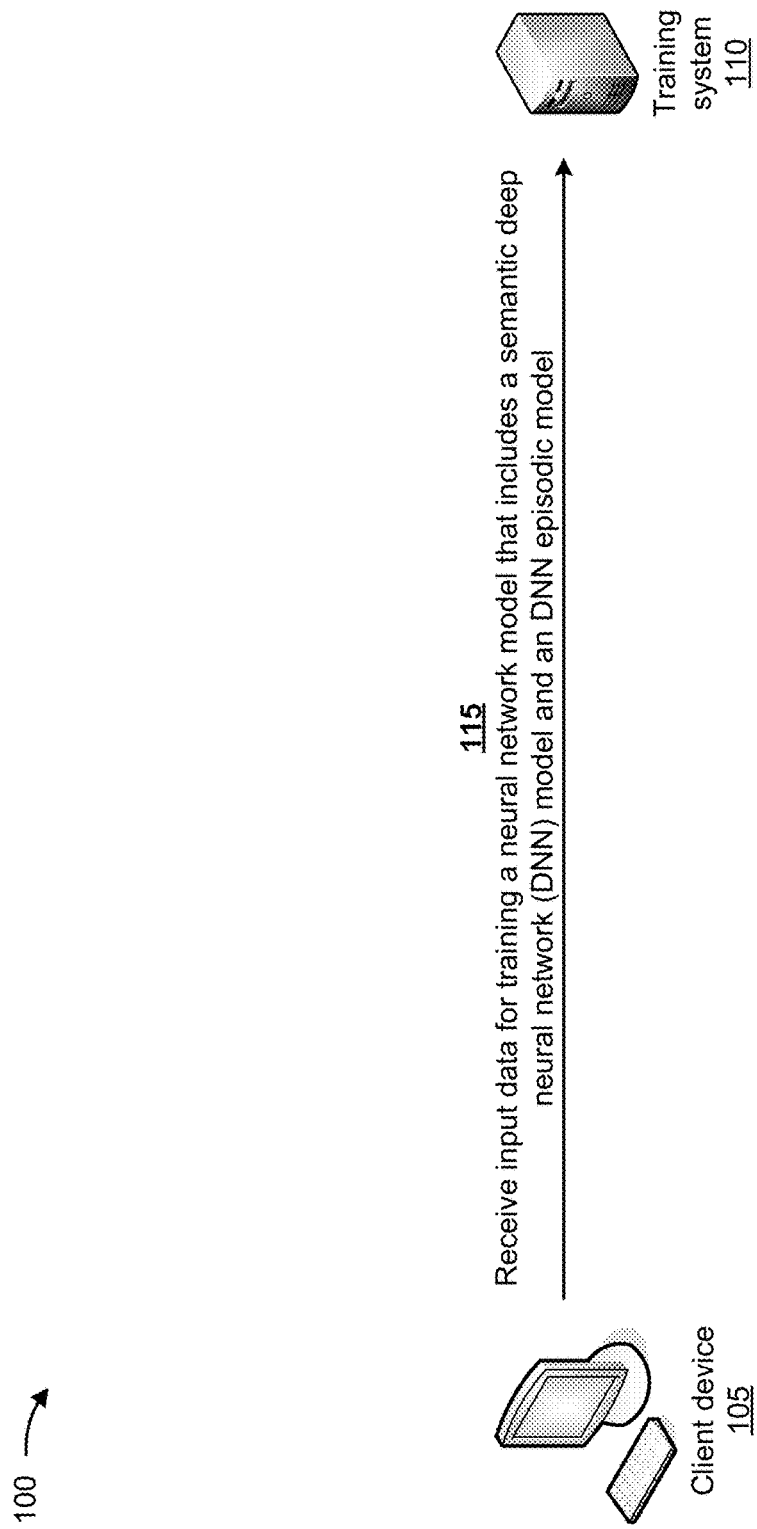
FIGS. 1A-1K are diagrams of an example implementation described herein.

The following detailed description of example implementations refers to the accompanying drawings. The same reference numbers in different drawings may identify the same or similar elements.

A machine learning model may be trained to process data to perform a task. For example, a machine learning model may be included in an autonomous driving system of a vehicle. The machine learning model trained to process an image and/or to detect an object (e.g., a vehicle, a traffic sign, and/or the like) depicted in the image and/or the video. The autonomous driving system may utilize an output of the machine learning model (e.g., information indicating the detected object) to control an operation of the vehicle (e.g., to cause the vehicle to stop based on the machine learning model detecting a stop sign in the image and/or the video).

As another example, a machine learning model may be trained to process text and/or audio data to determine information conveyed by the text and/or audio data and/or a context of the conveyed information. The machine learning model may receive audio data corresponding to a command spoken by the user. The machine learning model may process the audio data to determine the command and/or a context associated with the command. The machine learning model may provide an output indicating the command and/or the context associated with the command to a system associated with the machine learning model (e.g., an autonomous driving system). The system may perform cause an action to be performed (e.g., control an operation of the vehicle) based on the command and/or the context associated with the command.

The ability of the machine learning model to perform the task may depend on the training data used to train the machine learning model. For example, to train the machine learning model to detect a particular object (e.g., a vehicle) depicted in an image, the training data used to train the machine learning model may include images that depict the particular object. Generally, an accuracy of the machine learning model related to performing the task increases based on the quantity of data processed by the machine learning model.

In some instances, a user may wish to change the scope of the task performed by the machine learning model. For example, in addition to detecting the particular type of object, the user may wish to utilize the machine learning model to detect another type of object (e.g., an animal) depicted in an image. Similarly, the user may determine that the training data used to train the machine learning model was heavily imbalanced (e.g., contained only a relatively few number of images of a particular type of vehicle), did not contain a particular class of object (e.g., a particular type of vehicle, a newly designed traffic signal, a type of object for which a relatively long period of time is required to obtain training data, and/or the like).

To change the scope of the task performed by the machine learning model, the user must obtain additional training data that includes images depicting the other type of object. The user may utilize the additional training data to train a second machine learning model to detect the other type of object. To determine whether an image depicts the particular type of object and the other type of object, the image may be processed by both of the machine learning models. Utilizing both of the machine learning models to process the image may utilize a greater amount of computing resources (e.g., processor resources, memory resources, communication resources, and/or the like) relative to utilizing single machine learning model to process the image.

Alternatively, the user may utilize the original training data and the additional training data to retrain the machine learning model to detect the particular type of object and the other type of object. However, retraining the machine learning model may cause the proficiency of the machine learning model to detect the particular type of object (e.g., the accuracy of the machine learning model) to be reset to zero indicating that the machine learning model is to re-learn how to detect the particular type of object in addition to learning how to detect the other type of object. Thus, computing resources utilized to train the machine learning model based on the original training data may be wasted.

Some implementations described herein relate to a machine learning model that utilizes an episodic memory and a semantic memory to process data (e.g., classify an image, detect an object depicted in an image, and/or the like). The episodic memory may process the data based on a human episodic memory structure by memorizing discrete events (e.g., by comparing input data to learned data). For example, the episodic memory may include an episodic deep neural network (DNN) model that includes a memory layer storing one or more images and information indicating a classification associated with the one or more images. The episodic DNN may process an input image based on comparing features of the input image to features of the one or more images stored in the memory layer.

The semantic memory may process the data based on a human semantic memory structure by recognizing patterns associated with utilizing the episodic memory to process the data, generalizing the patterns to a concept, and processing input data based on the concept. For example, the semantic memory may include a semantic DNN model. The semantic DNN model may include a residual neural network. The semantic DNN model may utilize the residual neural network to process the data. As the accuracy of the semantic memory increases, the machine learning model transitions from relying more heavily on an output of the episodic memory to determine a result to relying more heavily on an output of the semantic memory to determine the result.

For example, a device may receive an image. The device may utilize an episodic memory to determine a first classification associated with the image. The device may utilize a semantic memory to determine a second classification associated with the image. The device may determine an accuracy associated with utilizing the semantic memory to determine the second classification. The device may determine that the image is associated with the first classification when the accuracy fails to satisfy a threshold accuracy. The device may determine that the image is associated with the second classification when the accuracy satisfies the threshold accuracy.

Some implementations described herein relate to a training system for generating, training, and/or utilizing a neural network model to perform a task. The neural network model may include a convolutional neural network (CNN) model, a semantic DNN model, and an episodic DNN model. The training system may obtain input data for training the neural network model. The input data may include a plurality of samples (e.g., a plurality of images) associated with a classification (e.g., a classification indicating a type of object depicted in the plurality of images). The training system may select a first sample, of the plurality of samples, as a reference sample. The training system may store the reference sample in a memory layer of the episodic DNN model.

The training system may provide a second sample, of the plurality of samples, to the CNN model as an input. The CNN model may process the second sample to determine a feature associated with the sample. The CNN model may generate an output identifying the feature and may provide the output to the episodic DNN model and the semantic DNN model.

The episodic DNN model may process the reference sample stored in the memory layer to determine a feature associated with the reference sample. The episodic DNN model may determine a similarity between the feature associated with the reference sample and the feature associated with the sample. The episodic DNN model may determine a likelihood that the sample is associated with the classification based on the similarity between the feature associated with the reference sample and the feature associated with the sample. The episodic DNN model may generate episodic output data indicating the likelihood that the sample is associated with the classification.

The semantic DNN model may include a residual neural network. The semantic DNN model may utilize the residual neural network to process the feature. The semantic DNN model may predict a classification associated with the sample based on processing the feature. The semantic DNN model may generate semantic output data that includes information indicating the predicted classification.

The training system may provide the semantic output data to a semantic confidence model. The semantic confidence model may determine a confidence score associated with the semantic output data. The confidence score may indicate an accuracy of the semantic DNN model with respect to predicting the classification associated with the sample. The confidence score may be determined based on comparing the predicted classification to the classification associated with the sample, based on a quantity times that the semantic DNN model has processed features associated with the sample, based on a quantity of times the semantic DNN model has processed features associated with the classification, and/or the like.

The training system may apply weights to the semantic output data and the episodic output data based on the confidence score. For example, the weight applied to the semantic output data may be greater than the weight applied to the episodic output data when the confidence score satisfies a threshold confidence score. The training system may combine the weighted semantic output data and the weighted episodic data to generate final output data indicating a likelihood that the sample is associated with the classification. In this way, the semantic output data may have a greater influence over the final output data generated by the neural network model as the accuracy of the semantic DNN model increases.

To enable the neural network model to determine that a sample is associated with an additional classification (e.g., to increase a scope of the task performed by the neural network model), the training system may store a reference sample associated with the additional classification in the memory layer. Prior to the semantic DNN model processing a sufficient quantity of samples to obtain a threshold accuracy associated with predicting that the sample is associated with the additional classification, the episodic output data may be weighted more heavily than the semantic output data. Alternatively, and/or additionally, the neural network model may determine to utilize only the episodic DNN model to process samples associated with the additional classification.

In this way, the neural network model may determine that the sample is associated with the additional classification without retraining the semantic DNN model thereby conserving computing resources that otherwise may have been utilized to retrain the semantic DNN model. Thus, the neural network model, when used to detect objects depicted in an image or video, is able to recognize new types of objects by storing images of the new types of objects in the memory layer of the episodic DNN model and without affecting an accuracy, precision, and/or recall of the neural network model on known objects.

Further, after an initial training stage, when the neural network model processes a difficult sample (e.g., a sample for which an accuracy associated with an output determined based on processing the sample fails to satisfy a threshold accuracy), the neural network model may store the difficult sample in the memory layer of the episodic DNN model. In this way, the neural network model may generate a memory of difficult samples to be utilized by the episodic DNN model thereby increasing an accuracy of the neural network model.

FIGS. 1A-1K are diagrams of one or more example implementations 100 described herein. As shown in FIGS. 1A-1K, the one or more implementations 100 include a client device 105 associated with a training system 110. The client device 105 may include a communication device and/or a computing device. For example, client device 105 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, and/or the like.

In some implementations, the client device 105 includes a sensor device for obtaining data that is utilized by the training system 110 to train a machine learning model and/or is processed by the machine learning model. The sensor device may include an image capture device (e.g., a camera, an infrared camera, a dashcam, and/or the like), a radar device, a lidar device, and/or the like.

In some implementations, the client device 105 may utilize an output of the machine learning model to perform a function. For example, the client device 105 may be associated with an autonomous driving system of a vehicle. The client device 105 may capture images of a scene proximate to the vehicle and may provide the images to the machine learning model. The machine learning model may process the images (e.g., to detect an object in the image, to determine a direction of travel of an object in the image, and/or the like) to generate an output. The machine learning model may provide the output to the autonomous driving system (e.g., via the client device 105). The autonomous driving system may perform one or more actions associated with controlling an operation of the vehicle based on the output.

As shown in FIG. 1A, and by reference number 115, the training system 110 receives input data for training a neural network model that includes a semantic deep neural network (DNN) model and a DNN episodic model. The input data may include a plurality of samples. For example, the input data may include a plurality of images, a plurality of sensor readings, and/or the like. The plurality of samples may be associated with a set of classifications associated with a result output by the neural network model.

As an example, the neural network model may be configured to detect an object depicted in an image. The plurality of samples may include a plurality of images obtained by an autonomous driving system of a vehicle. An image, of the plurality of images, may depict a vehicle. The set of classifications may correspond to a type of the vehicles depicted in the plurality of images (e.g., a car, a truck, a bus, a motorcycle, and/or the like). The training system 110 may use the plurality of images to train the neural network model to detect the type of vehicle depicted in the image and to output a result indicating that the image is associated with a classification, of the set of classifications, based on the type of vehicle being depicted in the image.

In some implementations, a sample, of the plurality of samples, is associated with an annotation. The annotation may include information identifying a classification, of the set of classifications, associated with the sample. As an example, the sample may be an image of a type of vehicle and the annotation may include information indicating that the type of vehicle is depicted in the image. The neural network model may utilize the annotation to learn to detect images of the type of vehicle.

The training system 110 may obtain the input data from a device storing data for training the neural network model, such as a server device, a data storage device, and/or the like. In some implementations, the input data may be obtained by a plurality of client devices 105. The plurality of client devices 105 may capture the input data and may provide the input data to the device. The device may receive the input data from the plurality of client devices 105 and may provide the input data to the training system 110 based on receiving the input data, periodically (e.g., daily, weekly, monthly, and/or the like), based on receiving a request from the training system 110, and/or the like.

Figure 1B:
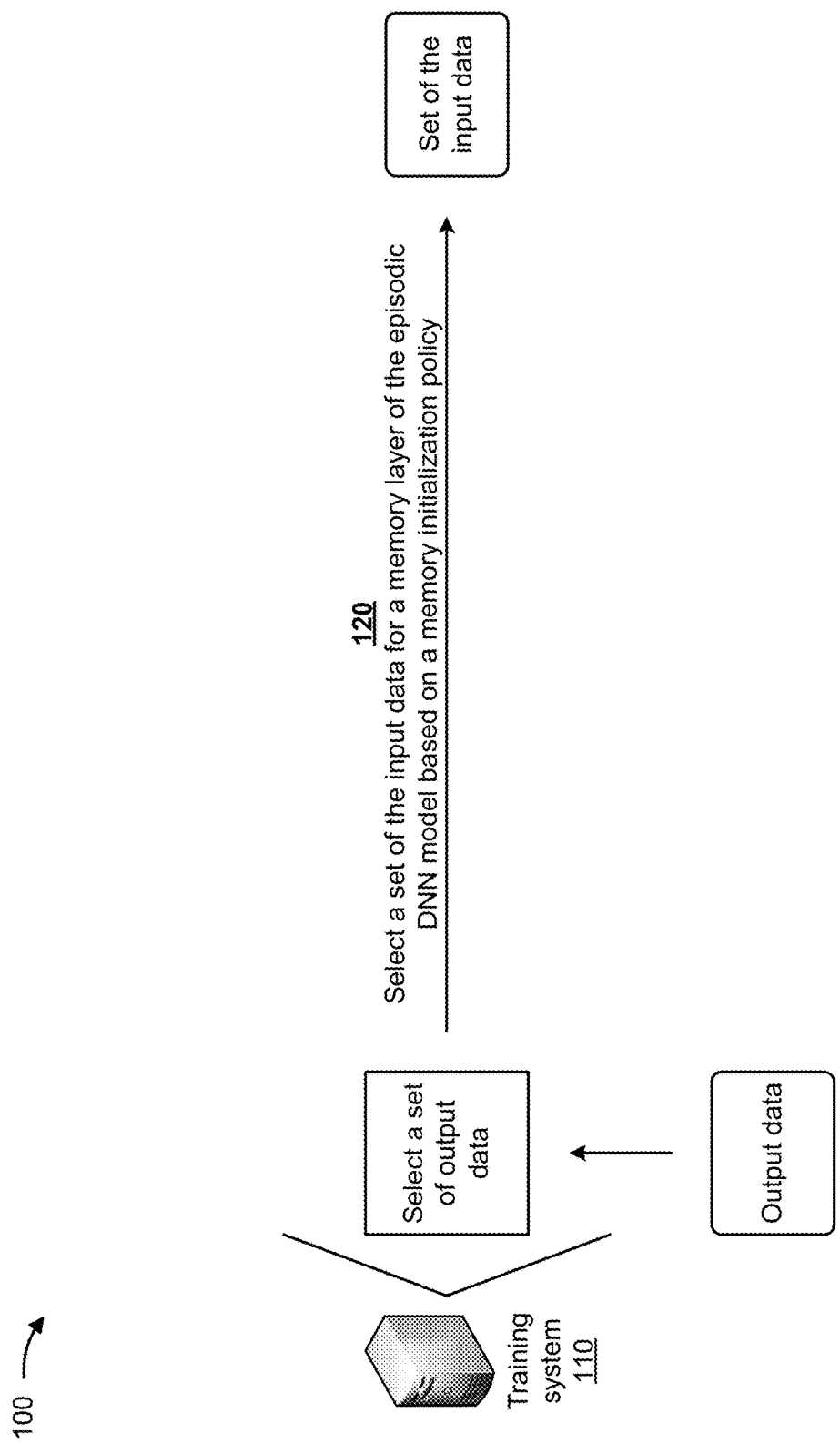

As shown in FIG. 1B, and by reference number 120, the training system 110 selects a set of the input data for a memory layer of the episodic DNN model based on a memory initialization policy. The set of the input data may include one or more sample pairs. A sample pair may include a sample, of the plurality of samples, included in the input data and the annotation associated with the sample. The episodic DNN model may utilize the one or more sample pairs to process the output data, as described below with respect to FIG. 1D.

The memory initialization policy may indicate a process to be utilized to select the set of input data. For example, the memory initialization policy may indicate that the training system 110 is to randomly select the set of input data, utilize a stratified sampling process to select the set of input data, select the set of input data based on centroids of the input data and utilizing a k-means algorithm or model, select the set of input data based on the centroids of the input data and utilizing a k-medoids clustering algorithm or model, and/or the like.

Figure 1C:
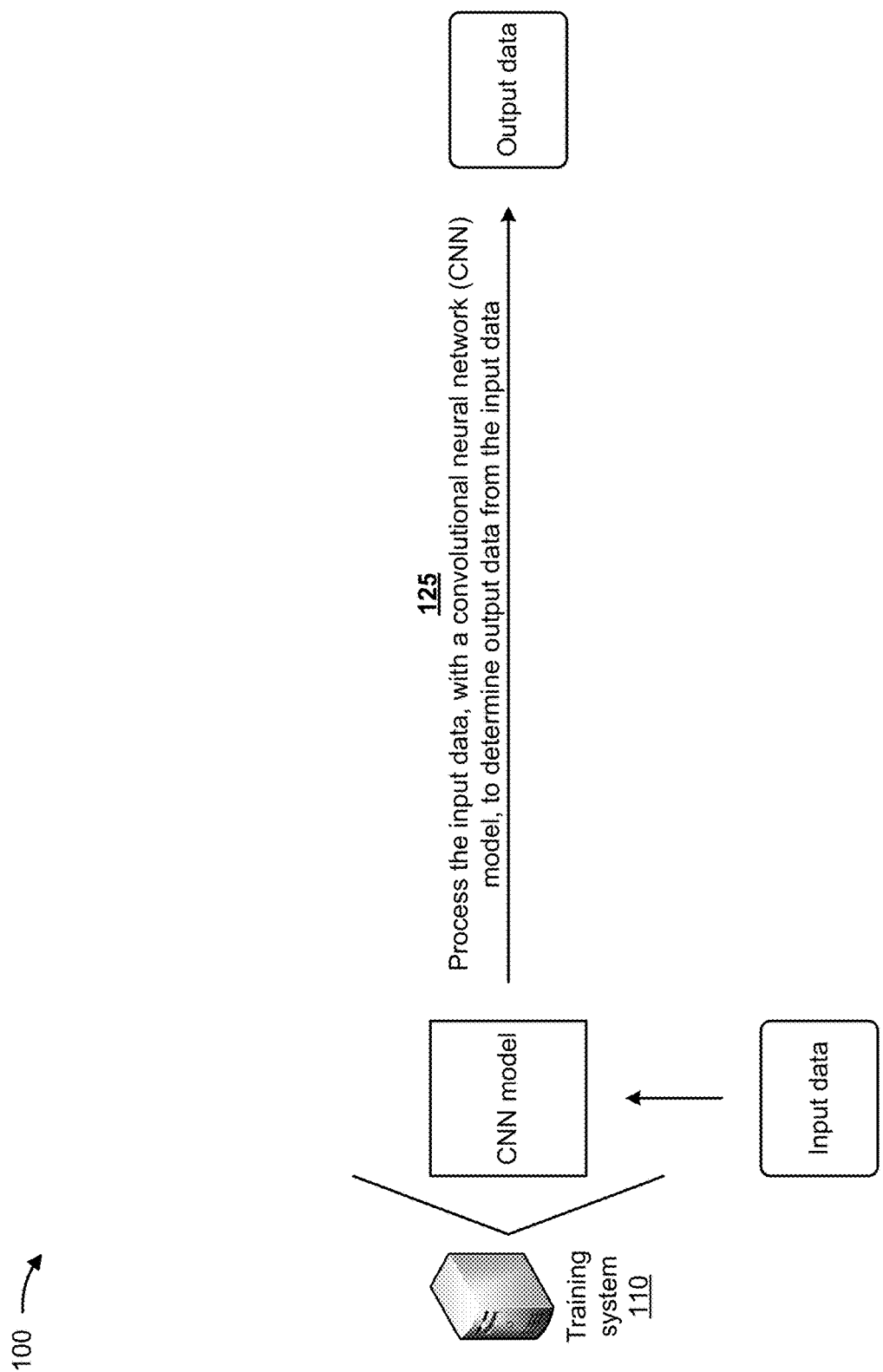

As shown in FIG. 1C, and by reference number 125, the training system 110 processes the input data, with a convolutional neural network (CNN) model, to determine output data from the input data. The CNN model may include a residual neural network (ResNet) model, a GoogLeNet model, and/or the like. The CNN model may include multiple layers of bi-dimensional convolutional filters. The bi-dimensional convolutional filters may be associated with a set of weights. The CNN model may determine values for the weights based on processing the input data as part of a training process for training the CNN model.

The input data may include a sample, of the plurality of samples. The CNN model may receive the sample as an input. The CNN model may process the sample to identify a feature set associated with the sample. The feature set may include a feature and a feature value. The feature may be a variable type (e.g., a facial feature, a vehicle feature, and/or the like). The feature value may be a value of the feature determined by processing the image. For example, the sample may be an image of a person and the CNN model may determine a feature value corresponding to a nose depicted in the image for the feature facial feature. The output data may include feature set (e.g., one or more features and/or corresponding feature values) determined by the CNN model for the sample.

In some implementations, the CNN model processes a portion of the sample based on a dropout procedure implemented by the training system 110. For example, the training system 110 may implement a dropout procedure to remove a portion of the sample (e.g., 70%, 75%, and/or the like) prior to providing the sample to the CNN model as an input, to remove a portion of the output data generated by the CNN model, and/or the like. In this way, the training system 110 may train the neural network model to detect particular features of the sample and/or to classify the sample based on detecting the particular features. Further, implementing the dropout procedure may affect an influence semantic output data has on final output data generated by the neural network model, as described below with respect to FIG. 1J.

Figure 1D:
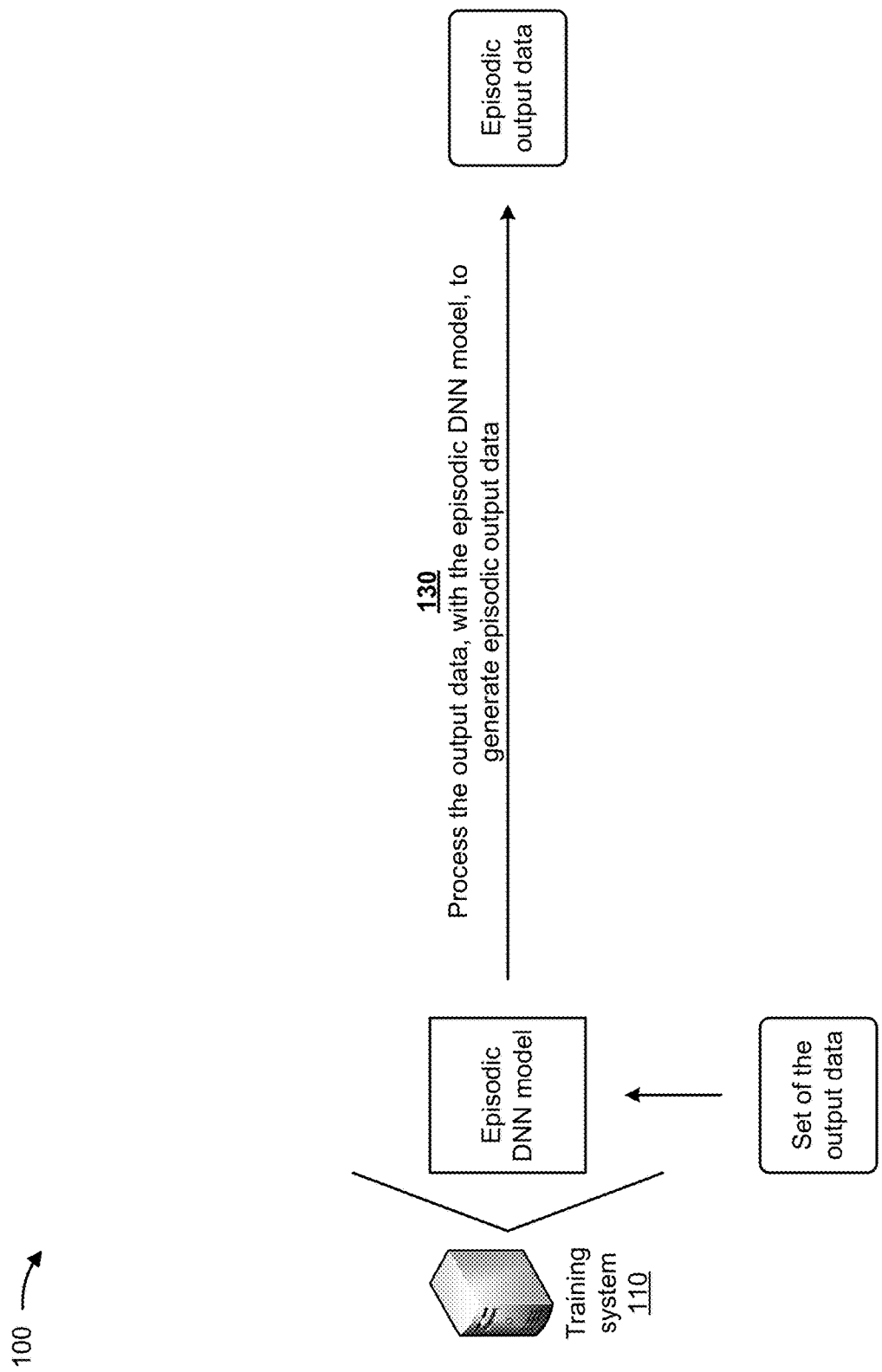

As shown in FIG. 1D, and by reference number 130, the training system 110 processes the output data, with the episodic DNN model, to generate episodic output data. The episodic output data may indicate a likelihood that the sample is associated with a classification. The episodic DNN model include a CNN model having a residual neural network architecture (e.g., a ResNet model). In some implementations, the CNN model included in the episodic DNN model may be the same as the CNN model used to process the input data.

The residual neural network may include a plurality of residual blocks that form layers of the residual neural network. The layers of the residual neural network may be connected via a direct connection (e.g., a connection that connects an output of a residual block in a first layer with an input of a residual block included in a next layer) and/or via a skip connection (e.g., a connection that connects the output of the residual block in the first layer with an output of the residual block included in the next layer). A quantity of the residual blocks may be a parameter that is configurable (e.g., by a user, learned by the episodic DNN model, and/or the like).

The episodic DNN model may utilize the residual neural network to determine a similarity between the sample provided as an input to the CNN model and a sample included in the set of input data stored in the memory layer. For example, the episodic DNN model may receive the output data generated by the CNN model as an input. The episodic DNN model may determine, based on the output data, a query vector corresponding to the feature set determined by the CNN model based on processing the input data.

The training system 110 may provide a sample, included in the set of input data and stored in the memory layer, to the episodic DNN model as an input. The episodic DNN model may process the sample to determine a feature set associated with the sample. In some implementations, the episodic DNN model may determine a key vector corresponding to the feature set associated with the sample.

The episodic DNN model may determine a similarity between the query vector and the key vector. In some implementations, the episodic DNN model may perform a dot product operation with the query vector and the key vector to determine a similarity score associated with the sample. The episodic DNN model may determine a similarity score for each sample included in the set of input data in a similar manner. The episodic DNN model may generate the episodic output data based on the similarity scores determined for the samples included in the set of input data. For example, the episodic DNN model may perform a softmax operation on the similarity scores to generate the episodic output data. The episodic output data may indicate a sample, of the set of input data, to which the output data of the CNN model is most similar based on a comparison of the query vector with the key vectors.

Figure 1E:
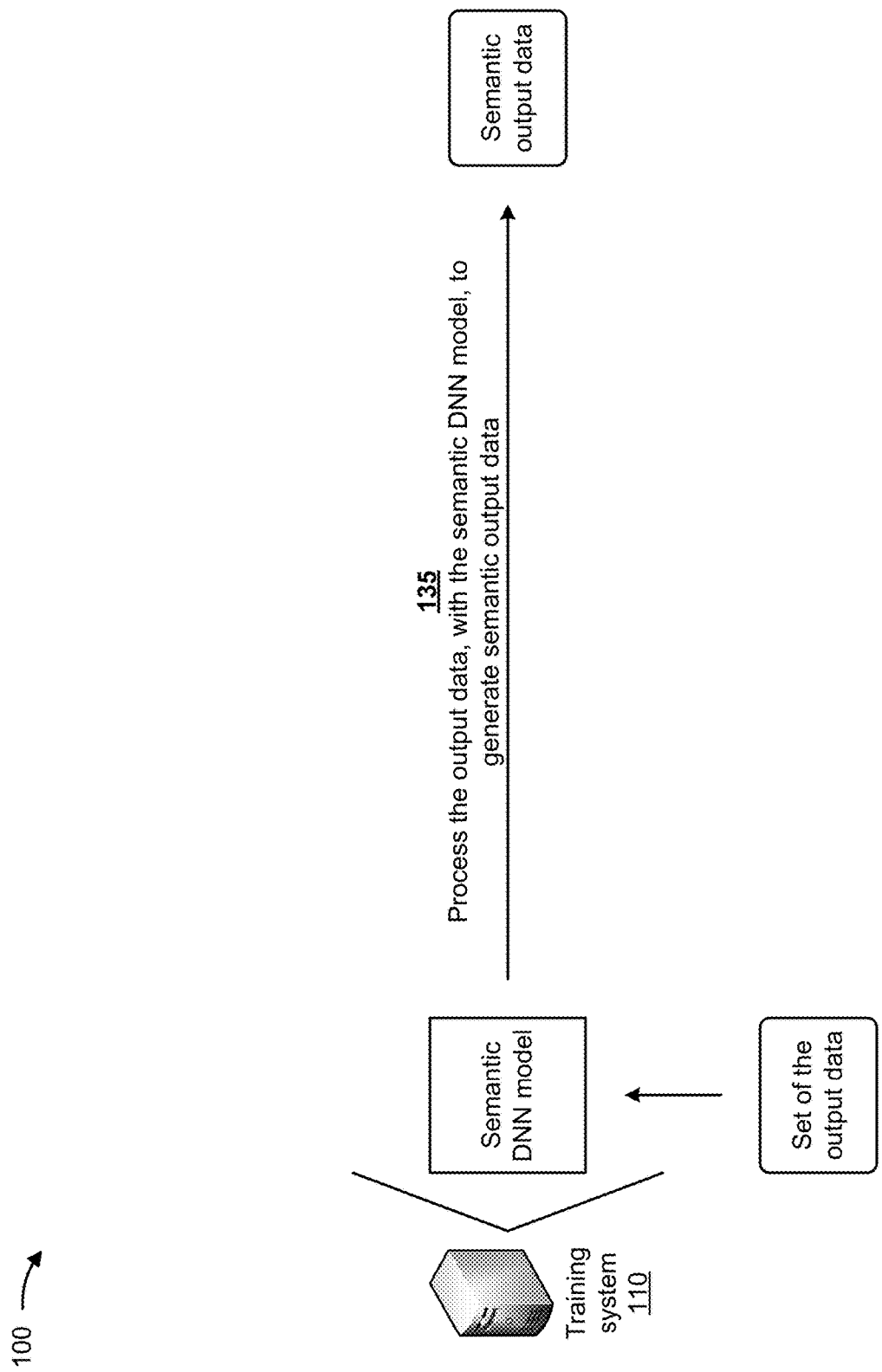

As shown in FIG. 1E, and by reference number 135, the training system 110 processes the output data, with the semantic DNN model, to generate semantic output data. The semantic DNN model may process the output data to predict a classification associated with the sample. The semantic output data may include information indicating the predicted classification. As an example, the semantic DNN model may process the output data to determine one or more features sets associated with the output data. The semantic DNN model may generate a feature vector that includes a series of information associated with the determined feature sets. The semantic DNN model may predict a classification associated with the samples based on the determined feature sets. For example, the semantic DNN model may determine a likelihood that a feature set, of the one or more features sets, indicates that the sample is associated with the classification.

In some implementations, the semantic DNN model utilizes a CNN to generate the semantic output data. For example, the semantic DNN model may include a CNN-based model such as a residual neural network (ResNet) model, a GoogLeNet model, an AlexNet model, and/or the like. The semantic DNN model may utilize the CNN-based model to process the output data and/or to generate the semantic output data.

Figure 1F:
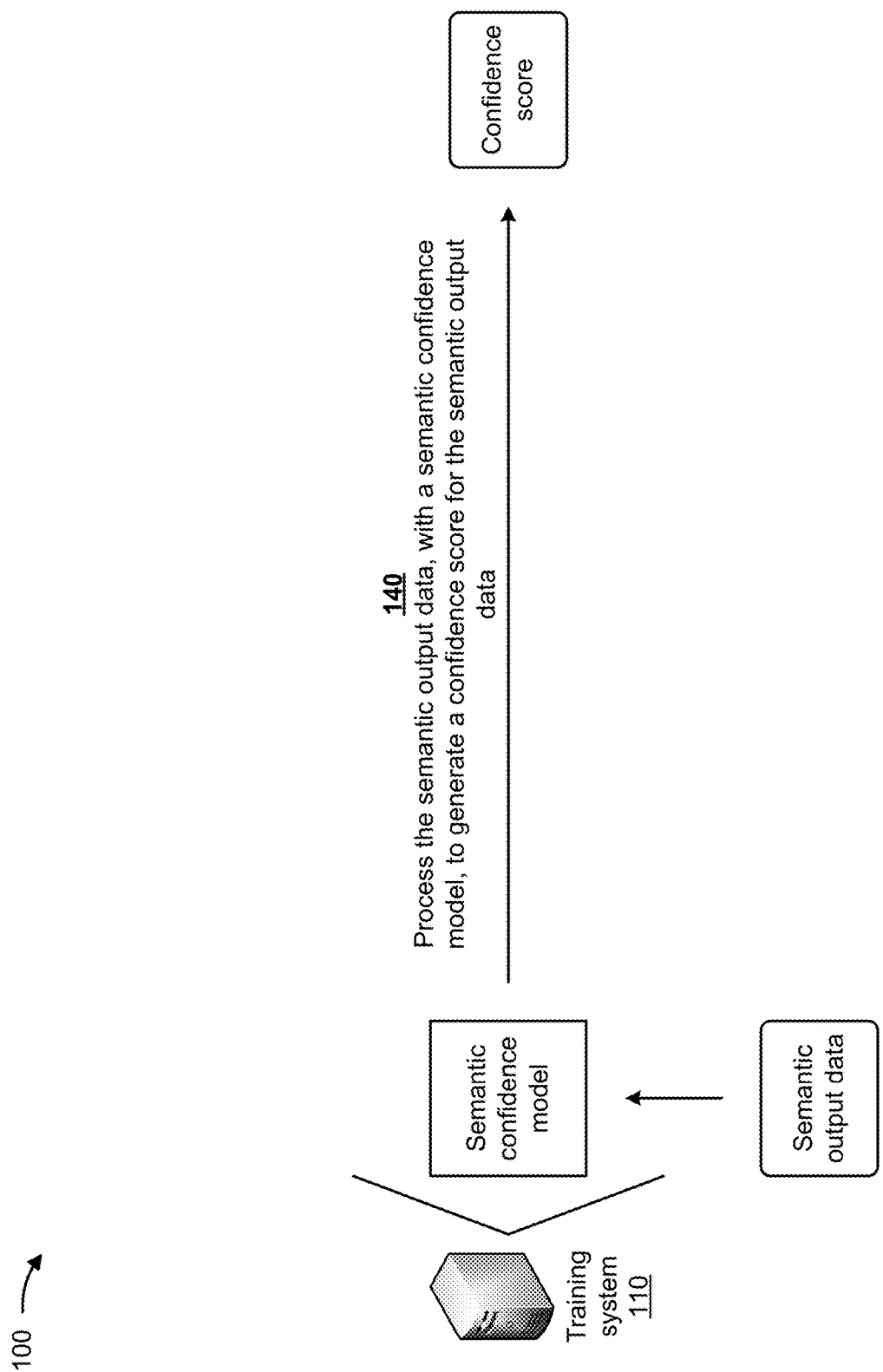

As shown in FIG. 1F, and by reference number 140, the training system 110 processes the semantic output data, with a semantic confidence model, to generate a confidence score for the semantic output data. In some implementations, a range of the confidence score is between 0.0 (e.g., 0% confidence) and 1.0 (e.g., 100% confidence). In some implementations, the semantic confidence model generates the confidence score based on the annotation associated with the sample processed by the CNN model to generate the output data. The semantic confidence model may determine a classification associated with the sample based on the annotation. The semantic confidence model may analyze the semantic output data and may determine a likelihood that the semantic output data indicates that the sample is associated with the classification based on the analysis. The semantic confidence model may determine the confidence score based on the likelihood that the semantic output data indicates that the sample is associated with the classification.

Alternatively, and/or additionally, the semantic confidence model generates the confidence score based on a quantity of output data processed by the semantic DNN model. The semantic confidence model may determine a classification associated with the sample based on the annotation associated with the sample. The semantic confidence model may determine a quantity of output data associated with the classification and processed by the semantic DNN model, a quantity of output data associated with the sample (e.g., a quantity of portions of the sample) and processed by the semantic DNN model, an accuracy of the semantic DNN model associated with predicting samples associated with the classification, and/or the like. The semantic confidence model may determine the confidence score based on the quantity of output data associated with the classification and processed by the semantic DNN model, the quantity of output data associated with the sample and processed by the semantic DNN model, the accuracy of the semantic DNN model associated with predicting samples associated with the classification, and/or the like.

As an example, the semantic confidence model may determine a first confidence score when the quantity of the output data associated with the classification and processed by the semantic DNN model satisfies a first threshold quantity (e.g., 100, 200, 500, and/or the like). The semantic confidence model may determine a second, higher confidence score relative to the first confidence score when the quantity of the output data satisfies a second, greater, threshold quantity (e.g., 1,000, 1,500, 5,000, and/or the like).

Figure 1G:
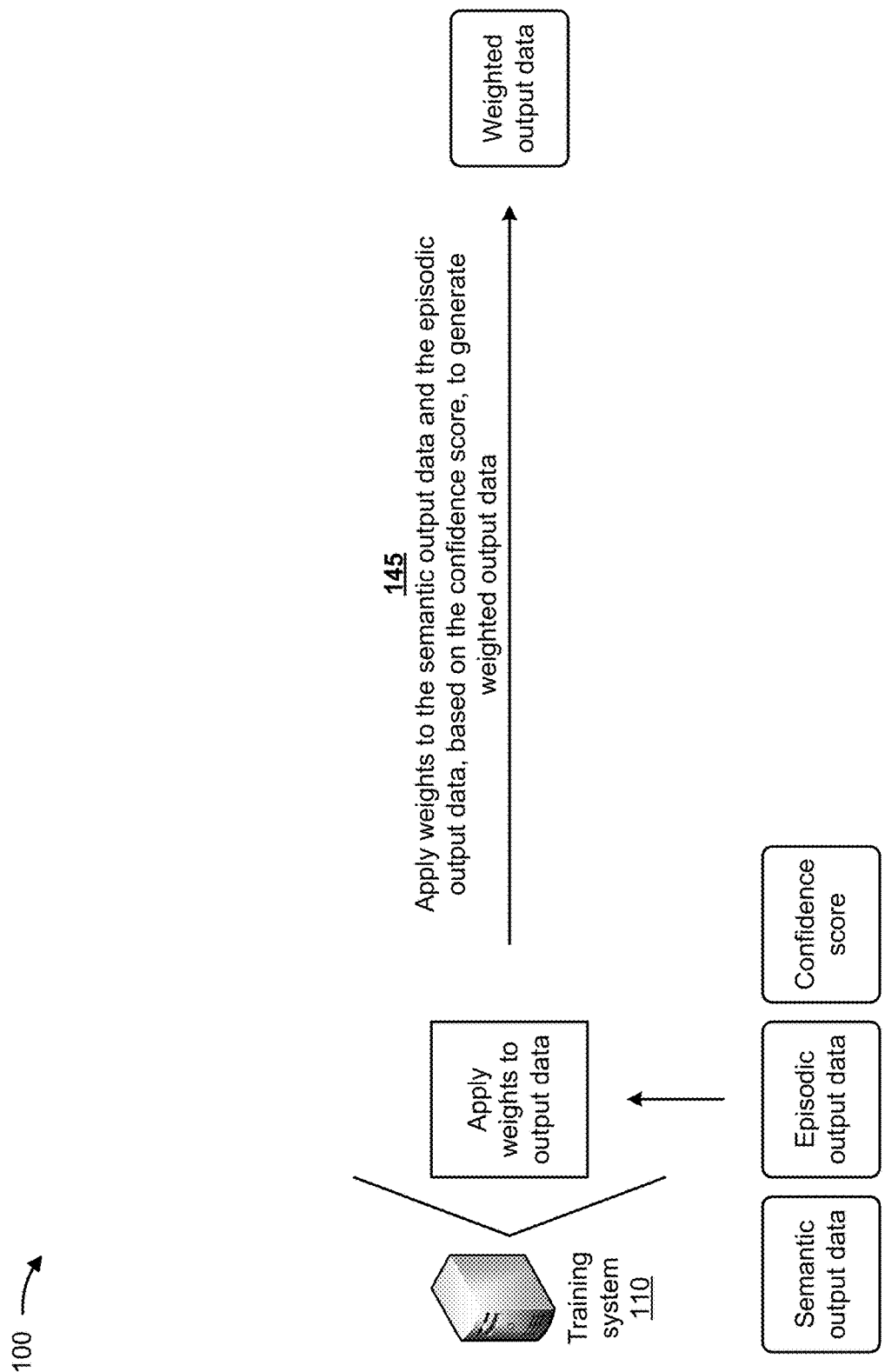

As shown in FIG. 1G, and by reference number 145, the training system 110 applies weights to the semantic output data and the episodic output data, based on the confidence score, to generate weighted output data. The training system 110 may apply the weights to the semantic output data and/or the episodic output data by multiplying the semantic output data and/or the episodic output data by a value. The training system 110 may apply a first weight to the semantic output data and a second weight to the episodic data based on the confidence score. The first weight may be greater than the second weight when the confidence score satisfies a first threshold confidence score (e.g., 0.6, 0.7, and/or the like). In some implementations, the first weight may be zero when the confidence score fails to satisfy a second threshold confidence score (e.g., 0.1, 0.2, 0.4, and/or the like). In some implementations, the first weight and/or the second weight may be determined based on the confidence score. For example, the first weight may be equal to a value of the confidence score. The second weight may be equal to 1−the value of the confidence score.

By applying weights to the semantic output data and the episodic data, the training system 110 may cause the semantic output data to have a greater effect on determining the final output data as the quantity of output data processed by the semantic DNN model increases, and, therefore, as an accuracy of the semantic DNN model increases. Further, by applying weights to the semantic output data and the episodic output data, the training system 110 may cause the episodic output data to have a greater effect on determining the final output data prior to the quantity of output data processed by the semantic DNN model being sufficient to cause the accuracy of the semantic DNN model to satisfy a threshold accuracy.

Figure 1H:
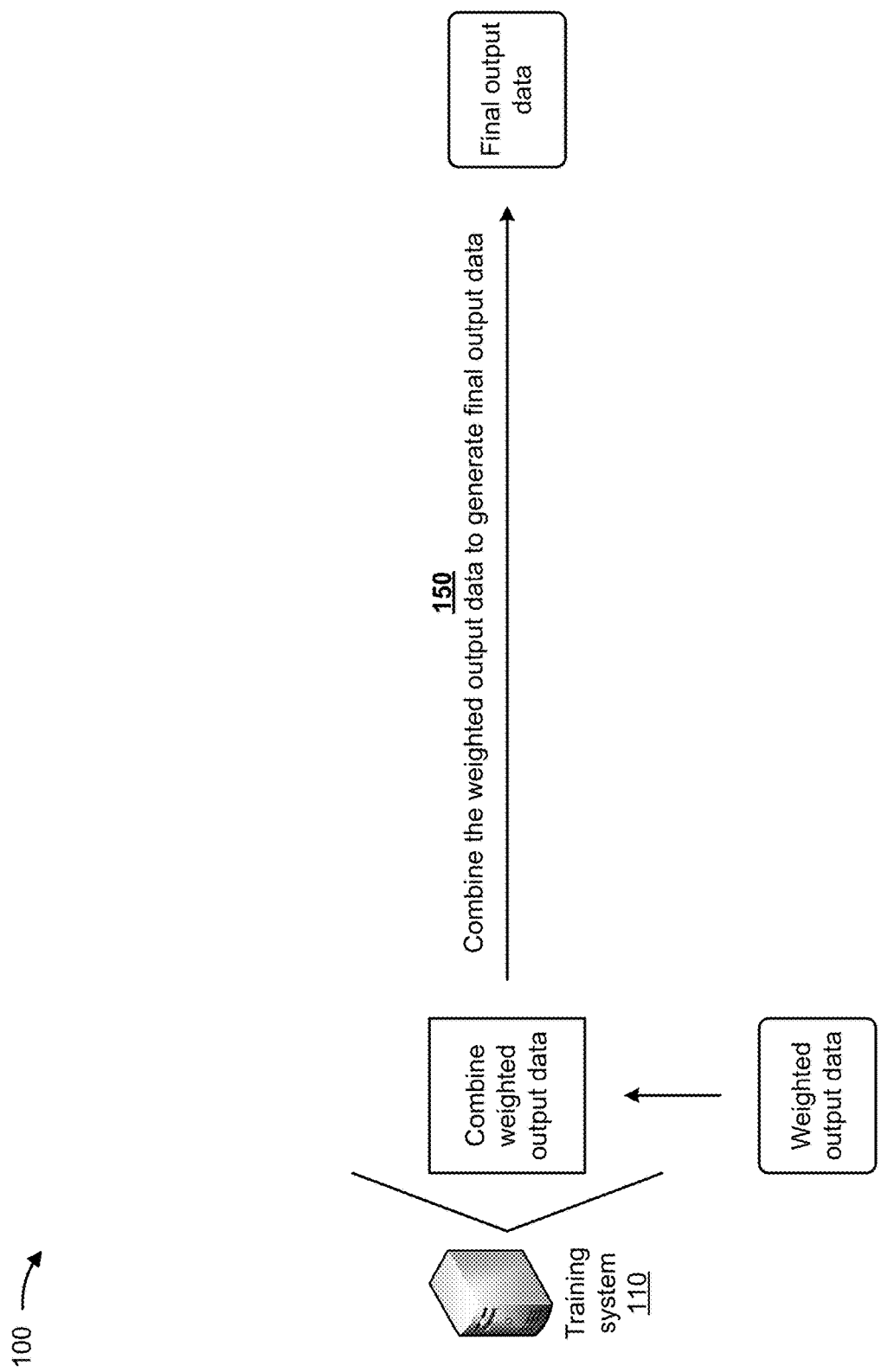

As shown in FIG. 1H, and by reference number 150, the training system 110 combines the weighted output data to generate final output data. The weighted semantic output data may include a first series of values and the weighted episodic output data may include a second series of values. The final output data may include a third series of values that is generated based on combining (e.g., adding, multiplying, and/or the like) values included in the first series of values with corresponding values included in the second series of values. For example, the training system 110 may generate a first value of the third series of values based on a sum of a first value of the first series of values and a first value of the second series of values.

In some implementations, the final output data includes a plurality of final output data (e.g., a plurality of series of values). The training system 110 may process a group of samples included in the input data. The training system 110 may process each sample, in the group of samples, and may generate respective final output data for each sample, in a manner similar to that described above. The final output data may include the respective final output data generated for each sample included in the group of samples.

Figure 1I:
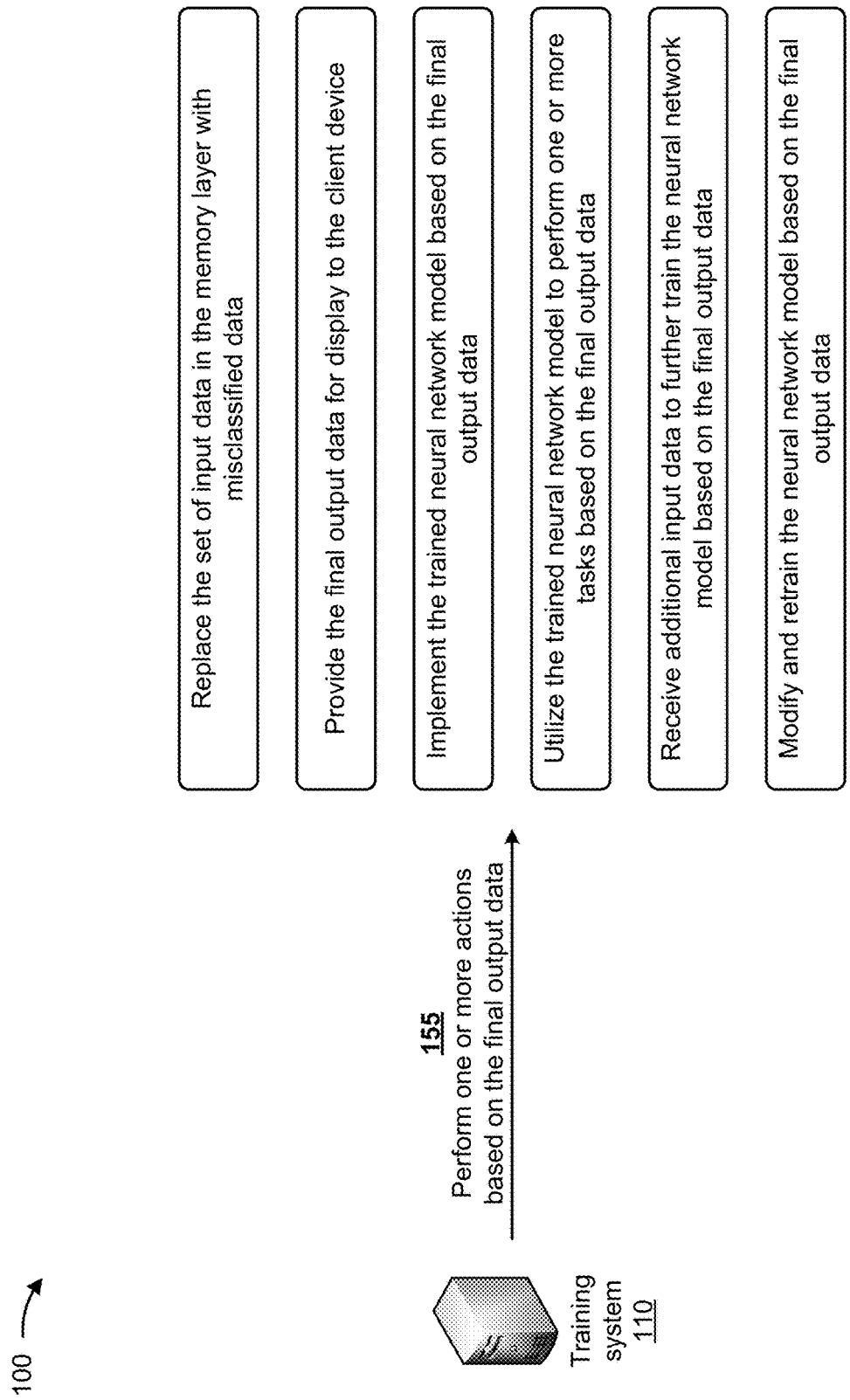

As shown in FIG. 1I, and by reference number 155, the training system 110 performs one or more actions based on the final output data. In some implementations, the one or more actions include replacing the set of input data in the memory layer with misclassified data. The final output data may include the plurality of final output data. The training system 110 may identify a set of final output data, of the plurality of final output data, that misclassifies the samples associated with the set of final output data. The training system 110 may replace one or more samples included in the memory layer with one or more of the samples associated with the final output data.

In some implementations, the training system 110 randomly selects the one or more samples from the samples associated with the set of final output data. For example, the plurality of samples may include a plurality of images captured by an autonomous driving system of a vehicle. The neural network model may process a set of images, of the plurality of images. The set of images may include a first image, a second image, and a third image. The neural network model may output first final output data, second final output data, and third final output data based on processing the first image, the second image, and the third image, respectively. The training system 110 may randomly select one or more of the first image, the second image, or the third image to replace the one or more samples included in the memory layer.

In some implementations, the training system 110 selects a sample, of the one or more samples selected from the samples associated with the set of final output data, based on the confidence score associated with the sample failing to satisfy a threshold confidence score (e.g., 0.1, 0.2. 0.4, and/or the like). Continuing with the example provided above, the first final output data may be associated with a confidence score of 1.0, the second final output data may be associated with a confidence score of 0.9, and the third final output data may be associated with a confidence score of 0.2. The training system 110 may determine that the confidence score associated with the third final output data fails to satisfy the threshold confidence score. The training system 110 may select the third image to be stored in the memory layer based on the third final output data failing to satisfy the threshold confidence score and based on the third image being associated with the third final output data.

In some implementations, the training system 110 selects the sample based on a correlation between the sample and other samples associated with the set of final output data. For example, the training system 110 may select the sample based on the sample being the least correlated to the other samples associated with the set of final output data relative to the other samples.

In some implementations, the training system 110 selects the sample based on the confidence score associated with the sample being the lowest confidence relative to the confidence scores associated with the other samples associated with the set of final output data. Continuing with the example provided above, the training system 110 may determine that the confidence score associated with the third final output data is lower than the confidence score associated with first final output data and the confidence score associated with the second final output data. The training system 110 may select the third image to be stored in the memory layer based on the confidence score associated with the third final output data being the lowest confidence score relative to the confidence scores associated with the first final output data and the second final output data and based on the third image being associated with the third final output data.

In some implementations, the one or more actions include providing the final output data for display. The training system 110 may provide the final output data to the client device 105 to cause the client device 105 to display the final output data to a user. In this way, the training system 110 may enable a user to quickly and efficiently analyze the final output data.

In some implementations, the one or more actions include implementing the trained neural network model based on the final output data. The training system 110 may determine that a particular quantity of samples have been processed by the neural network model, that a confidence score associated with the final output data satisfies a threshold confidence score, and/or the like. The training system 110 may implement the trained neural network model based on the particular quantity of samples having been processed by the neural network model, based on the confidence score associated with the final output data satisfying the threshold confidence score, and/or the like.

In some implementations, the one or more actions include utilizing the trained neural network model to perform one or more tasks based on the final output data. For example, the training system 110 may utilize the neural network model to perform one or more tasks associated with an autonomous driving system, such as determining that an image captured by a sensor of the autonomous driving system includes an image of a vehicle, determining a direction of travel of the vehicle depicted in the image, and/or the like.

In some implementations, the one or more actions include receiving additional input data to further train the neural network model based on the final output data and/or modifying and retraining the neural network model based on the final output data. For example, the neural network model may modify one or more parameters of the CNN model, one or more parameters of the episodic DNN model, one or more parameters of the semantic DNN model, and/or one or more parameters of the semantic confidence model based on the final output data.

Figure 1J:
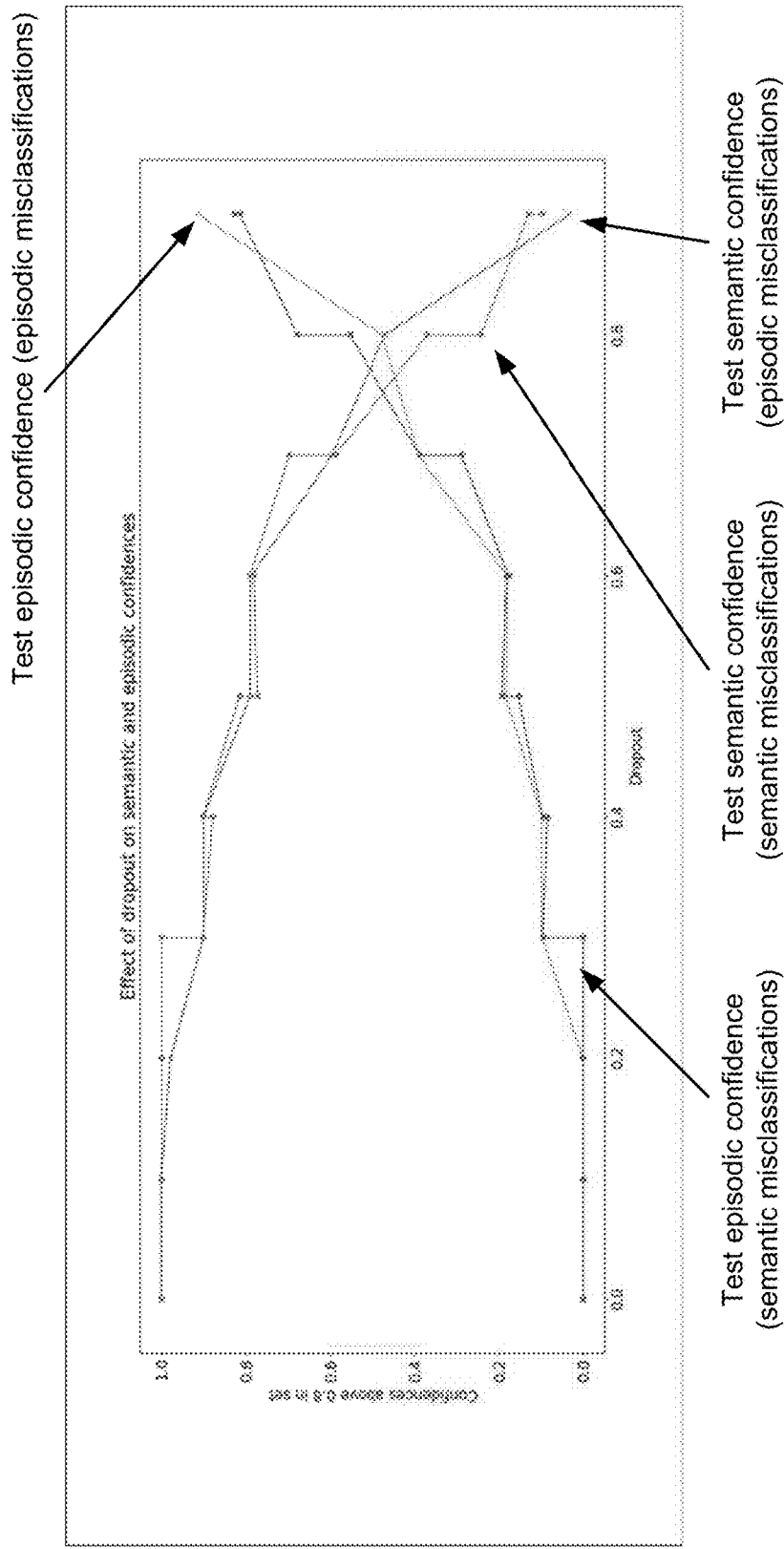

FIG. 1J is a diagram illustrating the influence of implementing a dropout procedure on the final output data. As shown in FIG. 1J, semantic confidence associated with the semantic output data remains fixed at 1.0 for dropout values below 0.4 (e.g., 40% of the sample is removed prior to the sample being provided to the CNN model as an input). Because the semantic confidence remains fixed at 1.0, the semantic output data may be used to generate the final output data (e.g., a weight of 0 is applied to the episodic output data). For dropout values above 0.4, the semantic confidence drops below 1.0 and the appropriate model output (e.g., the semantic output data or the episodic output data) is selected to predict the final output.

Figure 1K:
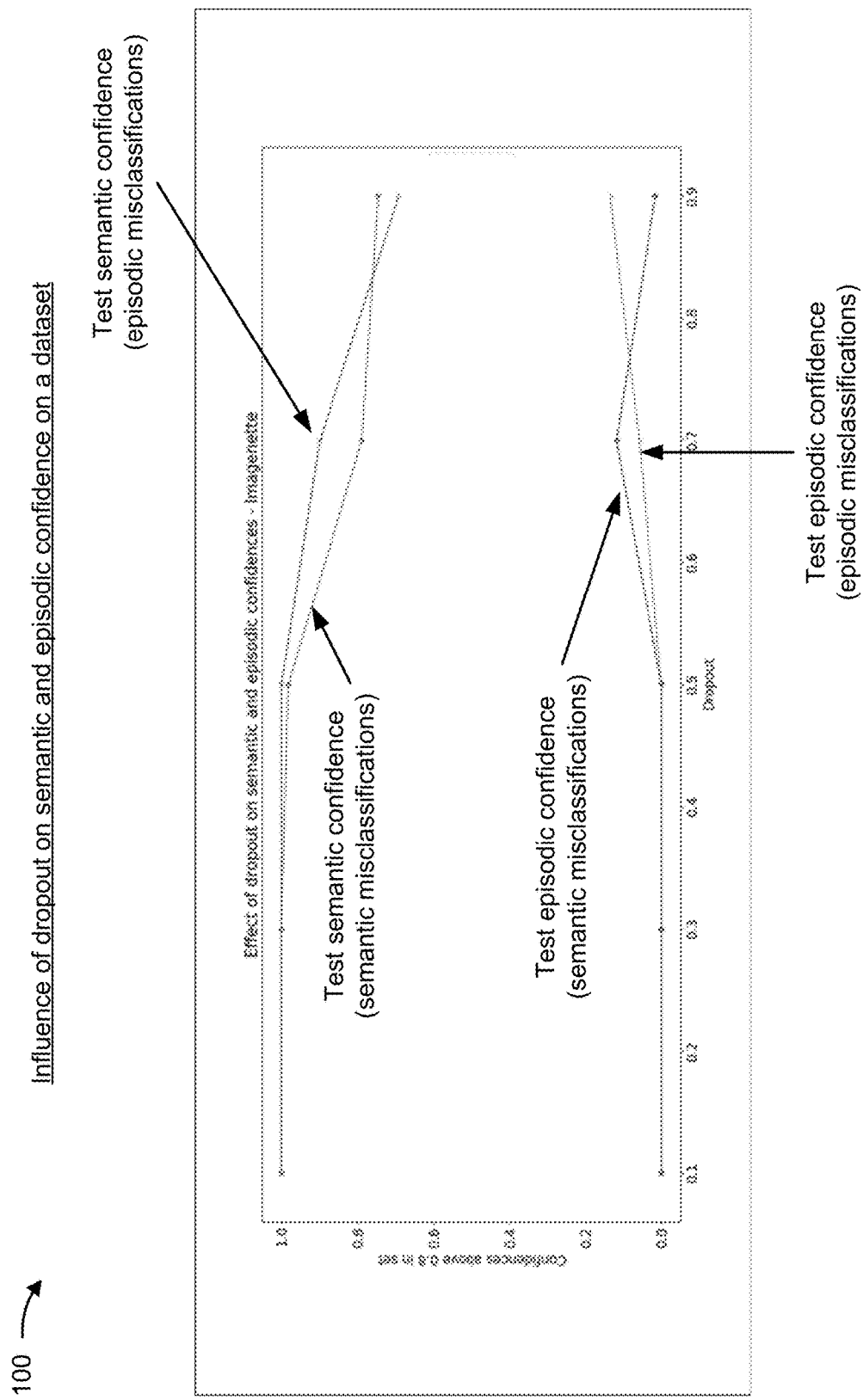

FIG. 1K is a diagram illustrating the influence of dropout on semantic and episodic confidence on a dataset based on replacing the set of input data in the memory layer with the least correlated samples associated with misclassified final output data. As shown in FIG. 1K, replacing the set of input data with the least correlated samples associated with misclassified episodic output data causes semantic confidence to rise slightly faster relative to utilizing the set of input data, without replacement, to train the neural network model.

As indicated above, FIGS. 1A-1K are provided as an example. Other examples may differ from what is described with regard to FIGS. 1A-1K. The number and arrangement of devices shown in FIGS. 1A-1K are provided as an example. In practice, there may be additional devices, fewer devices, different devices, or differently arranged devices than those shown in FIGS. 1A-1K. Furthermore, two or more devices shown in FIGS. 1A-1K may be implemented within a single device, or a single device shown in FIGS. 1A-1K may be implemented as multiple, distributed devices. Additionally, or alternatively, a set of devices (e.g., one or more devices) shown in FIGS. 1A-1K may perform one or more functions described as being performed by another set of devices shown in FIGS. 1A-1K.

FIG. 2 is a diagram of an example environment 200 in which systems and/or methods described herein may be implemented. As shown in FIG. 2, environment 200 may include a training system 110, which may include one or more elements of and/or may execute within a cloud computing system 202. The cloud computing system 202 may include one or more elements 203-213, as described in more detail below. As further shown in FIG. 2, environment 200 may include a network 220, and/or a client device 105. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the training system 110 may include one or more elements 203-213 of the cloud computing system 202, may execute within the cloud computing system 202, and/or may be hosted within the cloud computing system 202, in some implementations, the training system 110 may not be cloud-based (e.g., may be implemented outside of a cloud computing system) or may be partially cloud-based. For example, the training system 110 may include one or more devices that are not part of the cloud computing system 202, such as device 300 of FIG. 3, which may include a standalone server or another type of computing device. The training system 110 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or the like, and/or a combination of these or other types of networks. The network 220 enables communication among the devices of environment 200.

Client device 105 includes one or more devices capable of receiving, generating, storing, processing, and/or providing information associated with training a neural network that includes a semantic model and an episodic model, as described elsewhere herein. Client device 105 may include a communication device and/or a computing device. For example, client device 105 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. Client device 105 may communicate with one or more other devices of environment 200, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
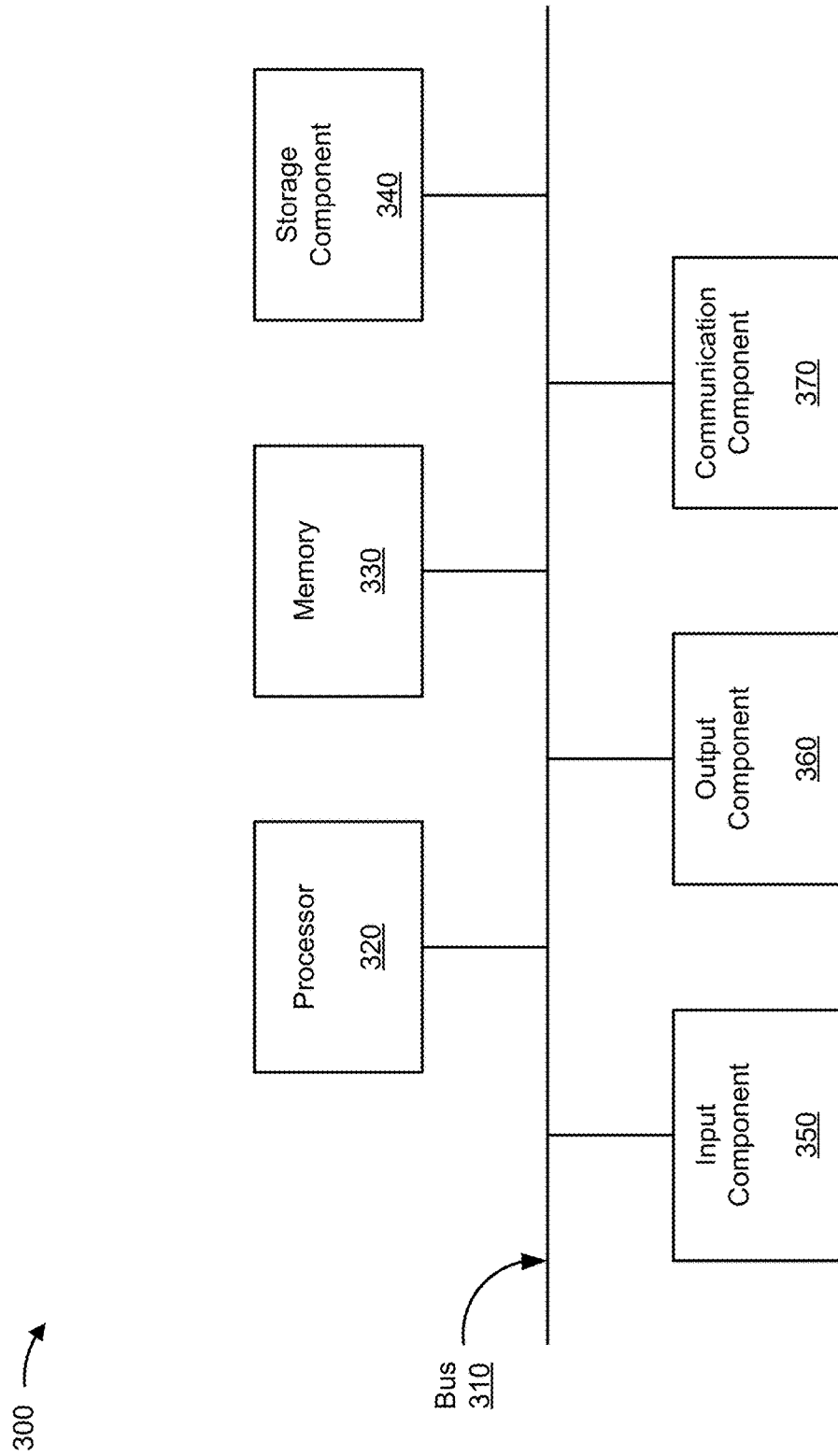
FIG. 3 is a diagram of example components of one or more devices of FIG. 2.

FIG. 3 is a diagram of example components of a device 300, which may correspond to training system 110 and/or client device 105. In some implementations, training system 110 and/or client device 105 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory), a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, an actuator, and/or the like. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, an antenna, and/or the like.

Device 300 may perform one or more processes described herein. For example, a non-transitory computer-readable medium (e.g., memory 330 and/or storage component 340) may store a set of instructions (e.g., one or more instructions, code, software code, program code, and/or the like) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
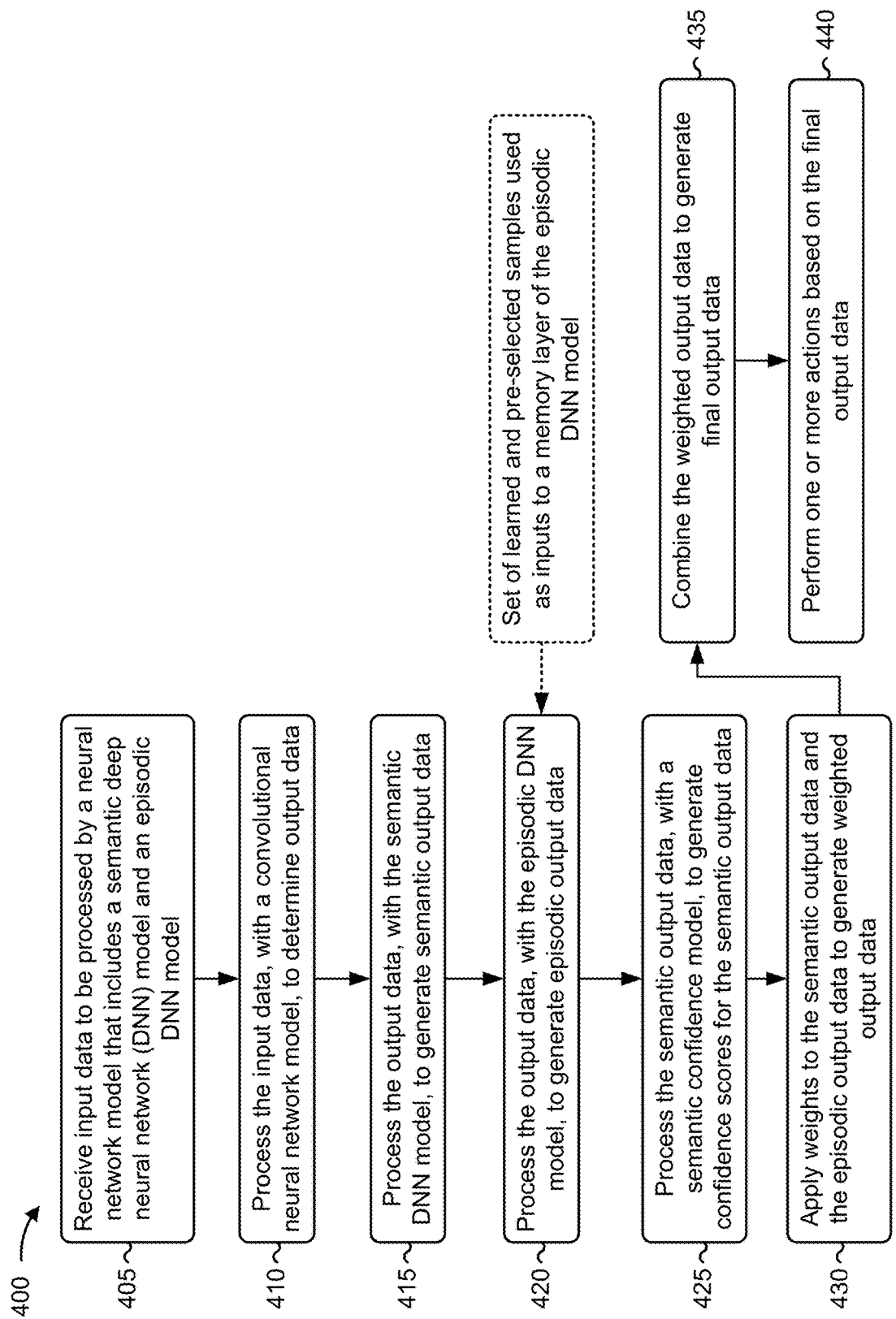
FIG. 4 is a flow chart of an example process relating to utilizing a machine learning model combining episodic and semantic information to process a new class of data without loss of semantic knowledge.

FIG. 4 is a flowchart of an example process 400 relating to utilizing a machine learning model combining episodic and semantic information to process a new class of data without loss of semantic knowledge. In some implementations, one or more process blocks of FIG. 4 may be performed by a device (e.g., training system 110). In some implementations, one or more process blocks of FIG. 4 may be performed by another device or a group of devices separate from or including the device, such as a client device (e.g., client device 105) and/or the like. Additionally, or alternatively, one or more process blocks of FIG. 4 may be performed by one or more components of a device 300, such as processor 320, memory 330, storage component 340, input component 350, output component 360, communication component 370, and/or the like.

As shown in FIG. 4, process 400 may include receiving input data to be processed by a neural network model that includes a semantic deep neural network (DNN) model and an episodic DNN model (block 405). For example, the device may receive input data to be processed by a neural network model that includes a semantic deep neural network (DNN) model and an episodic DNN model, as described above. In some implementations, the input data includes a plurality images. For example, the input data may include a plurality of grayscale images or a plurality of red, green, blue (RGB) images. The neural network model may process the input data to detect one or more objects depicted in an image of the plurality of images.

As further shown in FIG. 4, process 400 may include processing the input data, with a convolutional neural network model, to determine output data from the input data (block 410). For example, the device may process the input data, with a convolutional neural network model, to determine output data from the input data, as described above. The convolutional neural network model may include a residual networks model or a GoogLeNet model.

As further shown in FIG. 4, process 400 may include processing the output data, with the semantic DNN model, to generate semantic output data (block 415). For example, the device may process the output data, with the semantic DNN model, to generate semantic output data, as described above.

As further shown in FIG. 4, process 400 may include processing the output data, with the episodic DNN model, to generate episodic output data (block 420). For example, the device may process the output data, with the episodic DNN model, to generate episodic output data, as described above. In some implementations, as shown in FIG. 4, the device may process the output data with the episodic DNN model based on a set of learned and/or pre-selected samples used as inputs to a memory layer of the episodic DNN model.

In some implementations, processing the output data with the episodic DNN model comprises selecting a portion of the input data; storing the portion of the input data in a memory layer associated with the episodic DNN model; and processing the output data with the episodic DNN model based on the portion of the input data stored in the memory layer associated with the episodic DNN model. The device may select the portion of the input data by one or more of: randomly selecting the portion of the input data from the input data; selecting a percentage of the input data from different classes as the portion of the input data; selecting the portion of the input data based on centroids of the input data and a k-means model; or selecting the portion of the input data based on centroids of the input data and a k-medoids clustering model.

In some implementations, processing the output data with the episodic DNN model comprises determining features from the output data as query vectors; determining features from the set of the input data as key vectors; performing a dot product operation with the query vectors and the key vectors to determine similarity scores between the query vectors and the key vectors, and performing a softmax operation on the similarity scores to generate the episodic output data.

As further shown in FIG. 4, process 400 may include processing the semantic output data, with a semantic confidence model, to generate confidence scores for the semantic output data (block 425). For example, the device may process the semantic output data, with a semantic confidence model, to generate confidence scores for the semantic output data, as described above.

As further shown in FIG. 4, process 400 may include applying weights to the semantic output data and the episodic output data to generate weighted output data (block 430). For example, the device may apply weights to the semantic output data and the episodic output data, based on the confidence scores, to generate weighted output data, as described above.

In some implementations, applying the weights to the semantic output data and the episodic output data comprises one or more of applying greater weights to the semantic output data than weights applied to the episodic output data when the confidence scores satisfy a confidence score threshold; or applying lesser weights to the semantic output data than weights applied to the episodic output data when the confidence scores fail to satisfy the confidence score threshold.

As further shown in FIG. 4, process 400 may include combining the weighted output data to generate final output data (block 435). For example, the device may combine the weighted output data to generate final output data, as described above. The final output data may indicate the one or more objects depicted in the image.

In some implementations, the device may identify misclassified data in the final output data; and may replace the portion of the input data stored in the memory layer associated with the episodic DNN model with the misclassified data. The set of misclassified data may be utilized by the episodic DNN model to process additional output data determined by the convolutional neural network model based on the convolutional neural network model processing additional input data.

As further shown in FIG. 4, process 400 may include performing one or more actions based on the final output data (block 440). For example, the device may perform one or more actions based on the final output data, as described above.

In some implementations, performing the one or more actions comprises one or more of: providing the final output data for display; generating and implementing a trained neural network model based on the final output data; or generating and utilizing a trained neural network model to perform one or more tasks based on the final output data. Alternatively, and/or additionally, performing the one or more actions comprises one or more of: receiving additional input data to further train the neural network model based on the final output data; modifying and retraining the neural network model based on the final output data; or retraining one or more of the convolutional neural network model, the semantic DNN model, the episodic DNN model, or the semantic confidence model based on the final output data.

In some implementations, the one or more actions include receiving additional input data, retraining the neural network model based on the additional input data and to generate a retrained neural network model, and causing the retrained neural network model to be implemented. The trained neural network model may be utilized to perform one or more tasks.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
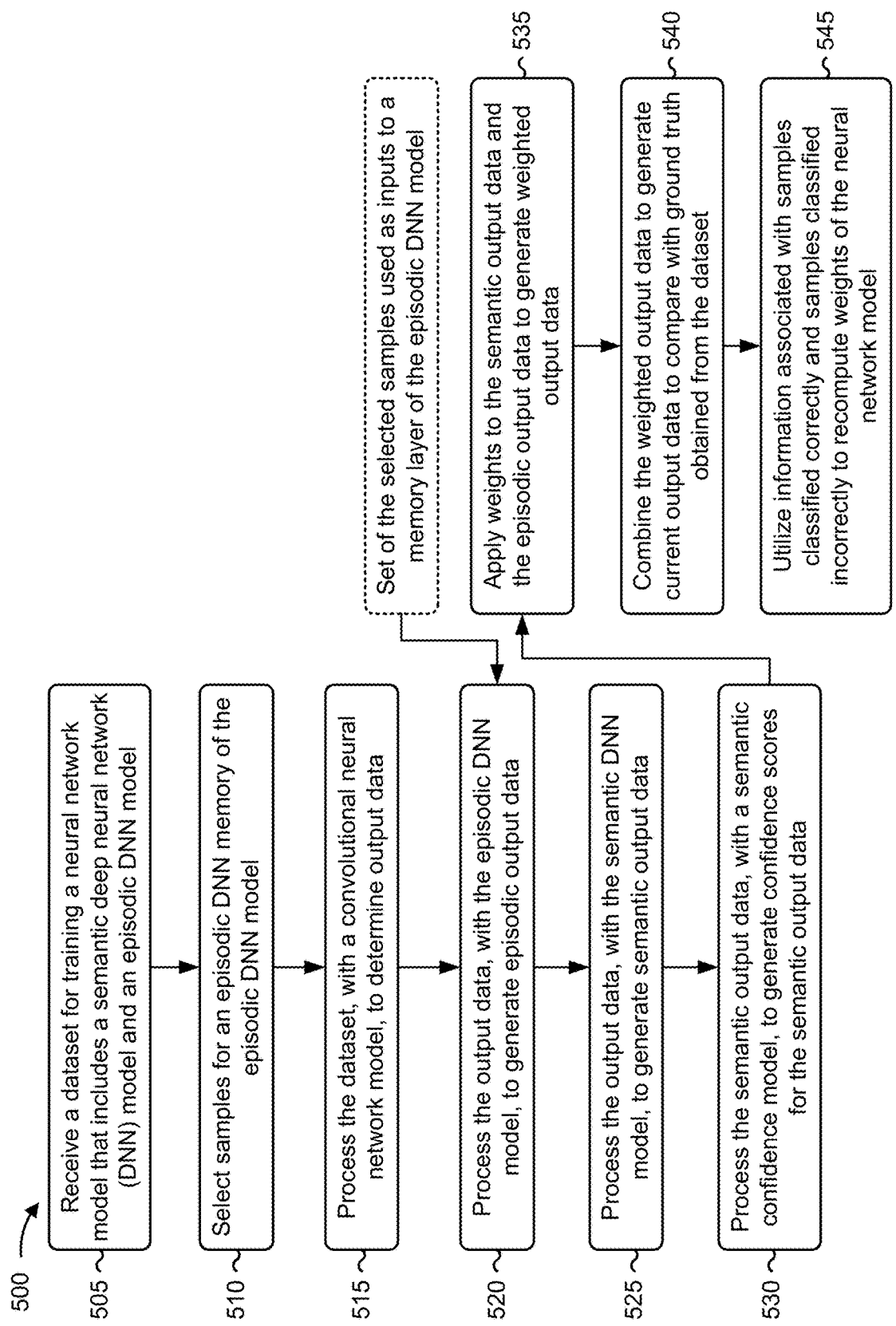
FIG. 5 is a flow chart of an example process relating to training a machine learning model combining episodic and semantic information to process a new class of data without loss of semantic knowledge.

FIG. 5 is a flowchart of an example process 500 relating to training a machine learning model combining episodic and semantic information to process a new class of data without loss of semantic knowledge. In some implementations, one or more process blocks of FIG. 5 may be performed by a device (e.g., training system 110). In some implementations, one or more process blocks of FIG. 5 may be performed by another device or a group of devices separate from or including the device, such as a client device (e.g., client device 105) and/or the like. Additionally, or alternatively, one or more process blocks of FIG. 5 may be performed by one or more components of a device 300, such as processor 320, memory 330, storage component 340, input component 350, output component 360, communication component 370, and/or the like.

As shown in FIG. 5, process 500 may include receiving a dataset for training a neural network model that includes a semantic deep neural network (DNN) model and an episodic DNN model (block 505). For example, a device may receive a dataset for training a neural network model that includes a semantic DNN model and an episodic DNN model, as described above. The data set may include a plurality of samples (e.g., images (e.g., RGB images, multispectral images, thermal images, and/or the like), audio data, text data, and/or the like) and ground truth for the plurality of samples.

As further shown in FIG. 5, process 500 may include selecting samples for an episodic DNN memory of the episodic DNN model (block 510). For example, the device may select samples for an episodic DNN memory of the episodic DNN model, as described above. In some implementations, the samples may be selected from the dataset.

As further shown in FIG. 5, process 500 may include processing the dataset, with a convolutional neural network model, to determine output data (block 515). For example, the device may process the dataset, with a convolutional neural network model, to determine output data, as described above. The dataset may include a plurality of samples. In some implementations, the plurality of samples comprises a plurality of images. The convolutional neural network model may process an image, of the plurality of images to identify a feature set associated with the image.

The feature set may include a feature and a feature value. The feature may be a variable type, such as a vehicle feature, a traffic sign feature, a facial feature, and/or the like. The feature value may be a value of the feature that is determined based on processing the image. The output data may include one or more feature sets, determined by the convolutional neural network model, based on processing the dataset.

As further shown in FIG. 5, process 500 may include processing the output data, with the episodic DNN model, to generate episodic output data (block 520). For example, the device may process the output data, with the episodic DNN model, to generate episodic output data, as described above. The device may process the output data, with the episodic DNN model, based on a set of the selected samples stored in the episodic DNN memory of the episodic DNN model. The set of the selected samples may be a set of samples that optimizes a performance of the episodic DNN model during a current stage of training the neural network model.

As further shown in FIG. 5, process 500 may include processing the output data, with the semantic DNN model, to generate semantic output data (block 525). For example, the device may process the output data, with the semantic DNN model, to generate semantic output data, as described above.

As further shown in FIG. 5, process 500 may include processing the semantic output data, with a semantic confidence model, to generate confidence scores for the semantic output data (block 530). For example, the device may process the semantic output data, with a semantic confidence model, to generate confidence scores for the semantic output data, as described above.

As further shown in FIG. 5, process 500 may include applying weights to the semantic output data and the episodic output data to generate weighted output data (block 535). For example, the device may apply weights to the semantic output data and the episodic output data to generate weighted output data, as described above.

As further shown in FIG. 5, process 500 may include combining the weighted output data to generate current output data to compare with ground truth obtained from the dataset (block 540). For example, the device may combine the weighted output data to generate current output data to compare with ground truth obtained from the data set, as described above.

As further shown in FIG. 5, process 500 may include utilizing information associated with samples classified correctly and samples classified incorrectly to recompute weights of the neural network model (block 545). For example, the device may utilize information associated with samples classified correctly and samples classified incorrectly to recompute weights of the neural network model, as described above. The weights of the neural network model may include weights associated with applying the weights to the semantic output data and the episodic output data to generate the weighted output data, weights associated with combining the weighted output data to generate the current output data, weights associated with the episodic DNN model, weights associated with the semantic DNN model, and/or the like.

In some implementations, the device selects a new set of samples for the episodic DNN memory based on recomputing the weights. The neural network model may process another dataset to further train the neural network model based on selecting the new set of samples for the episodic DNN memory. The neural network model may process the other dataset in a manner similar to that described above with respect to blocks 510-545.

In some implementations, the device may continue processing datasets until convergence. The device may determine that convergence has occurred based on satisfaction of a stopping criterion (e.g., a maximum quantity of iterations, an accuracy associated with processing a validation dataset satisfies a threshold accuracy, a loss associated with processing a validation dataset satisfies a threshold loss, and/or the like). The device may determine that the neural network model comprises a trained neural network model based on determining that convergence has occurred.

In some implementations, the device may utilize the trained neural network model to process an additional class of data. The device may store a new set of samples associated with the new class of data for the episodic DNN memory. The device may determine whether the datasets used to train the neural network model included a threshold quantity of samples associated with the additional class of data. When the datasets include the threshold quantity of samples, the device may utilize the episodic DNN model and the semantic DNN model to process the additional class of data. When the datasets do not include the threshold quantity of samples, the device may utilize only the episodic DNN model to process the additional class of data. In this way, the device may preserve semantic knowledge through the semantic DNN model and the set of samples selected for the episodic DNN memory.

The device may utilize the episodic DNN model and the semantic DNN model to process the additional class of data when the neural network model has processed the threshold quantity of samples associated with the additional class of data. In this way, the device may directly preserve semantic knowledge through the set of samples selected for the episodic DNN memory and may indirectly preserve semantic knowledge through the weights of the semantic DNN model.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
   receiving, by a device, an image for training a neural network model;
   utilizing, by the device and based on using the neural network model, an episodic memory to determine a first classification associated with the image;
   utilizing, by the device and based on using the neural network model, a semantic memory to determine a second classification associated with the image;
   determining, by the device, an accuracy associated with utilizing the semantic memory to determine the second classification;
   determining, by the device, that the image is associated with the first classification when the accuracy fails to satisfy a threshold accuracy; and
   determining, by the device, that the image is associated with the second classification when the accuracy satisfies the threshold accuracy.

2. The method of claim 1, wherein utilizing the episodic memory to determine the first classification comprises:
   processing the image with an episodic deep neural network model to determine the first classification associated with the image.

3. The method of claim 1, wherein the episodic memory includes an episodic deep neural network model that includes a memory layer storing one or more samples associated with the first classification, and
   wherein utilizing the episodic memory to determine the first classification comprises:
      processing the image with the episodic deep neural network model to determine a similarity between the image and the one or more samples; and
      determining that the image is associated with the first classification based on the similarity between the image and the one or more samples.

4. The method of claim 1, wherein utilizing the semantic memory to determine the second classification comprises:
   processing the image with a semantic deep neural network model to determine the second classification associated with the image.

5. The method of claim 1, further comprising:
   processing the image with a convolutional neural network model to determine output data;
   wherein utilizing the episodic memory to determine the first classification comprises:
      processing the output data with an episodic deep neural network model to determine the first classification associated with the image; and
   wherein utilizing the semantic memory to determine the second classification comprises:
      processing the output data with a semantic deep neural network model to determine the second classification associated with the image.

6. The method of claim 5, wherein processing the output data with the episodic deep neural network model to determine the first classification comprises:
   determining features from the output data as query vectors;
   determining features from a portion of the image as key vectors;
   performing a dot product operation with the query vectors and the key vectors to determine similarity scores between the query vectors and the key vectors;
   performing a softmax operation on the similarity scores to generate a result; and
   determining the first classification associated with the image based on the result.

7. The method of claim 1, wherein determining the accuracy associated with utilizing the semantic memory to determine the second classification comprises:
   processing an output generated based on utilizing the semantic memory to determine the second classification associated with the image with a semantic confidence model to generate a confidence score indicating the accuracy associated with utilizing the semantic memory to determine the second classification.

8. A device, comprising:
one or more processors configured to:
receive input data for training a neural network model that includes a semantic deep neural network (DNN) model and an episodic DNN model;
process the input data, with a convolutional neural network model, to determine output data from the input data;
process the output data, with the semantic DNN model, to generate semantic output data;
process the output data, with the episodic DNN model, to generate episodic output data;
process the semantic output data, with a semantic confidence model, to generate confidence scores for the semantic output data;
apply weights to the semantic output data and the episodic output data, based on the confidence scores, to generate weighted output data;
combine the weighted output data to generate final output data;
generate a trained neural network model based on the final output data; and
perform one or more actions based on the trained neural network model.

9. The device of claim 8, wherein the convolutional neural network model includes a residual networks model or a GoogLeNet model.

10. The device of claim 8, wherein the one or more processors are further configured to:
receive additional input data;
retrain the neural network model based on the additional input data and to generate a retrained neural network model; and
cause the retrained neural network model to be implemented.

11. The device of claim 8, wherein the one or more processors, when performing the one or more actions, are configured to one or more of:
implement the trained neural network model; or
utilize the trained neural network model to perform one or more tasks.

12. The device of claim 8, wherein the one or more processors, when processing the output data, with the episodic DNN model, to generate the episodic output data, are configured to:
select a portion of the input data;
store the portion of the input data in a memory layer associated with the episodic DNN model; and
process the output data with the episodic DNN model based on the portion of the input data stored in the memory layer associated with the episodic DNN model.

13. The device of claim 12, wherein the one or more processors are further configured to:
identify misclassified data in the final output data; and
replace the portion of the input data stored in the memory layer associated with the episodic DNN model with the misclassified data.

14. The device of claim 8, wherein the one or more processors, when processing the output data, with the episodic DNN model, to generate the episodic output data, are configured to:
determine features from the output data as query vectors;
determine features from a set of the input data as key vectors;
perform a dot product operation with the query vectors and the key vectors to determine similarity scores between the query vectors and the key vectors; and
perform a softmax operation on the similarity scores to generate the episodic output data.

15. A non-transitory computer-readable medium storing instructions, the instructions comprising:
one or more instructions that, when executed by one or more processors, cause the one or more processors to:
receive input data to be processed by a neural network model that includes a semantic deep neural network (DNN) model and an episodic DNN model,
wherein the input data includes a plurality of images, and
wherein the neural network model processes the input data to detect one or more objects included in the plurality of images;
process the input data, with a convolutional neural network model, to determine output data from the input data;
process the output data, with the semantic DNN model, to generate semantic output data;
process the output data, with the episodic DNN model, to generate episodic output data;
process the semantic output data, with a semantic confidence model, to generate confidence scores for the semantic output data;
combine the semantic output data and the episodic output data, based on the confidence scores, to generate final output data; and
perform one or more actions based on the final output data.

16. The non-transitory computer-readable medium of claim 15, wherein the one or more instructions, that cause the one or more processors to perform the one or more actions, cause the one or more processors to one or more of:
provide the final output data for display;
generate and implement a trained neural network model based on the final output data;
generate and utilize a trained neural network model to perform one or more tasks based on the final output data;
receive additional input data to further train the neural network model based on the final output data;
modify and retrain the neural network model based on the final output data; or
retrain one or more of the convolutional neural network model, the semantic DNN model, the episodic DNN model, or the semantic confidence model based on the final output data.

17. The non-transitory computer-readable medium of claim 15, wherein the one or more instructions, that cause the one or more processors to process the output data with the episodic DNN model, cause the one or more processors to:
select a set of the input data;
store the set of the input data in a memory layer associated with the episodic DNN model; and
process the output data with the episodic DNN model based on the set of the input data.

18. The non-transitory computer-readable medium of claim 17, wherein the one or more instructions, when executed by the one or more processors, further cause the one or more processors to:
identify misclassified data in the final output data;

select a set of the misclassified data; and
replace the set of the input data in the memory layer with the set of the misclassified data,
wherein the set of the misclassified data is utilized by the episodic DNN model to process additional output data determined by the convolutional neural network model based on the convolutional neural network model processing additional input data.

19. The non-transitory computer-readable medium of claim 15, wherein the one or more instructions, that cause the one or more processors to process the output data, with the episodic DNN model, to generate the episodic output data, cause the one or more processors to:
determine features from the output data as query vectors;
determine features from a set of input data as key vectors;
perform a dot product operation with the query vectors and the key vectors to determine similarity scores between the query vectors and the key vectors; and
perform a softmax operation on the similarity scores to generate the episodic output data.

20. The non-transitory computer-readable medium of claim 15, wherein the one or more instructions, when executed by the one or more processors, further cause the one or more processors to:
receive additional input data;
retrain the neural network model based on the additional input data and to generate a trained neural network model; and
cause the trained neural network model to be implemented.

* * * * *